United States Patent
Zhang et al.

(10) Patent No.: US 12,045,947 B2
(45) Date of Patent: Jul. 23, 2024

(54) DISPLAY APPARATUS AND IMAGE SCALING METHOD

(71) Applicant: QINGDAO HISENSE MEDIA NETWORKS LTD., Shandong (CN)

(72) Inventors: Huiyue Zhang, Shandong (CN); Yican Yang, Shandong (CN)

(73) Assignee: QINGDAO HISENSE MEDIA NETWORKS LTD., Shandong (CN)

(*) Notice: Subject to any disclaimer, the term of this patent is extended or adjusted under 35 U.S.C. 154(b) by 443 days.

(21) Appl. No.: 17/645,511

(22) Filed: Dec. 22, 2021

(65) Prior Publication Data

US 2022/0114695 A1 Apr. 14, 2022

Related U.S. Application Data

(63) Continuation of application No. PCT/CN2020/076703, filed on Feb. 26, 2020.

(30) Foreign Application Priority Data

Jul. 16, 2019 (CN) .................. 201910641912.X

(51) Int. Cl.
*G06T 3/40* (2024.01)
*H04N 21/4402* (2011.01)

(52) U.S. Cl.
CPC ........... *G06T 3/40* (2013.01); *H04N 21/4402* (2013.01)

(58) Field of Classification Search
None
See application file for complete search history.

(56) References Cited

U.S. PATENT DOCUMENTS

| 6,407,747 | B1 | 6/2002 | Chui et al. |
| 2012/0056903 | A1 | 3/2012 | Shinohara et al. |
| 2015/0341654 | A1 | 11/2015 | Zhou et al. |
| 2016/0042494 | A1* | 2/2016 | Baek ............... H04N 5/445 348/468 |

(Continued)

FOREIGN PATENT DOCUMENTS

| CN | 106980510 A | 7/2017 |
| CN | 107786904 A | 3/2018 |

(Continued)

OTHER PUBLICATIONS

Chinese Office Action, mailed Mar. 3, 2022, from Chinese App. No. 201910642088.X.

(Continued)

*Primary Examiner* — Yanna Wu
(74) *Attorney, Agent, or Firm* — Workman Nydegger

(57) ABSTRACT

The disclosure provides a display apparatus and an image scaling method. The display apparatus includes a display, configured to present a video image of a video layer and recommend information of a user layer, where the video image, in a region overlapped with an image display region in the user layer, in the video layer is visible; and a controller, configured to receive an instruction for enlarging the video image, where the image display region of the user layer is enlarged according to a first scaling rule; determine location information of the image display region, and generate a second scaling rule; and enlarge the video image in the video layer according to the second scaling rule.

18 Claims, 22 Drawing Sheets

(56) References Cited

U.S. PATENT DOCUMENTS

| | | |
|---|---|---|
| 2017/0180807 A1 | 6/2017 | He |
| 2017/0302719 A1 | 10/2017 | Chen et al. |
| 2018/0096459 A1* | 4/2018 | Zhou .................... G06T 3/4092 |
| 2019/0014372 A1* | 1/2019 | Kandagal ............ G06F 3/04845 |

FOREIGN PATENT DOCUMENTS

| | | |
|---|---|---|
| CN | 107852531 A | 3/2018 |
| CN | 109547838 A | 3/2019 |
| JP | 2007207048 A | 8/2007 |
| JP | 2010117828 A | 5/2010 |

OTHER PUBLICATIONS

International Search Report, mailed May 15, 2020, from PCT patent application No. PCT/CN2020/076703 filed Feb. 26, 2020.

* cited by examiner

DISPLAY APPARATUS AND IMAGE SCALING METHOD

The application is a continuation application of International Application No. PCT/CN2020/076703 filed on Feb. 26, 2020, which claims the priority of the Chinese patent application No. 201910641912.X filed on Jul. 16, 2019, the entire contents are incorporated herein by reference.

FIELD

The disclosure relates to the technical field of image scaling, in particular to a display apparatus and an image scaling method.

BACKGROUND

As network and smart devices are more and more popular, users have more choices for channels and modes in watching video programs. For example, all kinds of video applications such as video on demand are installed on devices such as a smart television or a mobile phone, and the devices run the display applications, so that the users can select and watch videos.

A user interface usually includes an on screen display (OSD) layer and a video layer, the OSD layer is configured to provide video profile and other basic information, and the video layer is configured to display frames of video images.

At present, the video applications may provide a function for switching between small-screen and full-screen. When a video window is in a small-screen, the topmost layer of a display interface displays the OSD layer. The OSD layer adopts a mode like "hole digging", and the theme of a current control (activity) of the OSD layer is set to be transparent or semitransparent at the area of a video playing window, so that video images output on the video layer can be seen.

In a process of switching from the small-screen to the full-screen, the OSD layer and the video layer are respectively switched from small-screen images to full-screen images through one step according to respective rules. When scaling speeds are inconsistent, phenomena of the black edge and edge cutting caused by non-synchronous switching are likely to occur, gradual change of an intermediate state is further omitted, the images cannot be dynamically scaled to a preset window according to user demand, and a bad user experience is brought to the users.

SUMMARY

The disclosure provides a scaling method of a video image in a user interface presented on a display apparatus, a video image scaling service apparatus and a display apparatus, so as to achieve an effect of scaling the video image in a gradual change manner.

In a first aspect, the disclosure provides a display apparatus, including: a display, configured to present a user interface; where the user interface is configured to present a video image of a video layer and recommend information of a user layer; the user layer includes an image display region; and the video image, in a region overlapped with the image display region of the user layer, in the video layer is visible; and a controller in communication with the display, where the controller is configured to: present the user interface; receive an instruction for indicating enlarging the video image from a user, and enlarge the image display region of the user layer according to a first scaling rule; determine location information of the image display region in a preset time period to generate a second scaling rule; and enlarge the video image in the video layer to a target display location according to the second scaling rule.

In a second aspect, the disclosure provides a scaling method of a video image in a user interface of a display apparatus, including: receiving an instruction for indicating enlarging the video image from a user, and enlarging an image display region of a user layer according to a first scaling rule; determining location information of the image display region in a preset time period to generate a second scaling rule; and enlarging a video image in a video layer to a target display location according to the second scaling rule; where the user interface is configured to present the video image of the video layer and recommend information of the user layer; the user layer includes the image display region; and the video image, in a region overlapped with the image display region of the user layer, in the video layer is visible.

DETAILED DESCRIPTION OF THE EMBODIMENTS

In order to make those of skilled in the art better understand the schemes of the disclosure, the schemes in the embodiments of the disclosure will be described clearly and completely with reference to the drawings in the embodiments of the disclosure. Obviously, the described embodiments are only part of the embodiments of the disclosure, but not all the embodiments. On the basis of the embodiments in the disclosure, all other embodiments obtained by a person of ordinary skill in the art without creative efforts fall within the protection scope of the disclosure.

It should be understood that terms "first", "second", "third" and the like in the specification, the claim and the above drawings in the disclosure are configured to distinguish similar objects, and are not necessarily configured to describe the specific order or sequence. It should be understood that data used in this way can be interchanged under a proper case, for example, can be implemented according to an order except for those given in diagrams or description of the disclosure.

A term "remote control" used in the disclosure refers to a component of an electronic device (such as a display apparatus disclosed in the disclosure), and usually may wirelessly control the electronic device in a short distance range. The remote control generally is connected with the electronic device by using an infrared ray and/or a radio frequency (RF) signal and/or Bluetooth, and may also include functional modules such as WiFi, a wireless USB, Bluetooth and a motion sensor. For example, a handheld touch remote control uses a user interface in a touch screen to replace most of physical built-in hard keys in a general remote control device.

Figure 1:
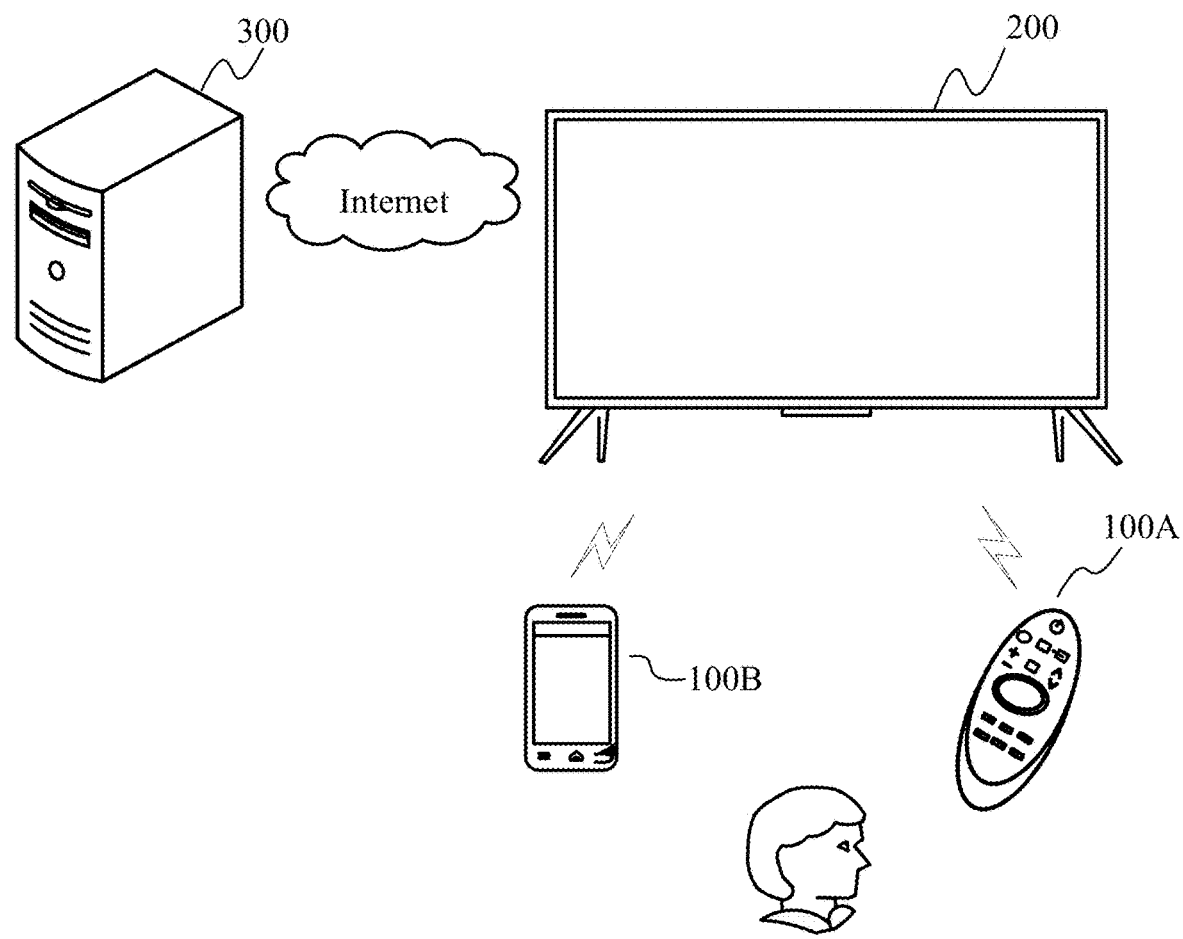
FIG. 1 is an operating scene diagram between a display apparatus and a control device according to an exemplary embodiment.

FIG. 1 is an operating scene diagram between a display apparatus and a control device according to an exemplary embodiment. As shown in FIG. 1, a user may operate the display apparatus 200 through the control device 100.

The control device 100 may be a remote control 100A, including infrared protocol communication or Bluetooth protocol communication and other short-distance communication modes, and controlling the display apparatus 200 in wireless or other wired modes. The user may input a user command through keys, voice input, control panel input and the like on the remote control to control the display apparatus 200. For example, the user may input corresponding commands through volume up/down keys, channel control keys, up/down/left/right directional keys, a voice input key, a menu key, power keys and the like on the remote control, so as to realize the function of controlling the display apparatus 200.

The control device 100 may also be an intelligent device, such as a mobile terminal 100B, a tablet computer, a computer and a notebook computer. For example, an application running on the intelligent device is used to control the display apparatus 200. The application may provide various controls for the user on a screen associated with the intelligent device through an intuitive user interface (UI).

Exemplarily, software applications may be installed on both the mobile terminal 100B and the display apparatus 200, so as to realize connection and communication through a network communication protocol, and further achieve the purposes of one-to-one control operations and data communication. For example, a control instruction protocol may be established between the mobile terminal 100B and the display apparatus 200 to synchronize a remote control keyboard to the mobile terminal 100B, and the function of controlling the display apparatus 200 is achieved by controlling a user interface on the mobile terminal 100B; and audio and video contents displayed on the mobile terminal 100B may also be transmitted onto the display apparatus 200 so as to realize a synchronous display function.

As shown in FIG. 1, the display apparatus 200 may further conduct data communication with a server 300 by multiple communication modes. The display apparatus 200 may be allowed to perform communication connection through a local area network (LAN), a wireless local area network (WLAN) and other networks. The server 300 may provide various contents and interactions for the display apparatus 200. Exemplarily, the display apparatus 200 receives software program update or accesses a remotely-stored digital media library by sending and receiving information and electronic program guide (EPG) interaction. The server 300 may be one or more groups, and may be one or more kinds of servers. Other network service contents such as video on demand and advertising service are provided by the server 300.

The display apparatus 200 may be a liquid crystal display, an organic light emitting display (OLED), and a projection device. Types, sizes, resolutions, and the like of specific display apparatuses are not limited. The skilled in the art may understand that the display apparatus 200 may make some changes in performance and configuration according to needs.

In addition to the broadcast receiving television function, the display apparatus 200 may additionally provide an intelligent network television function that a computer support. Exemplarily, the display apparatus includes a network television, a display apparatus, an Internet protocol television (IPTV) and the like.

Figure 2:
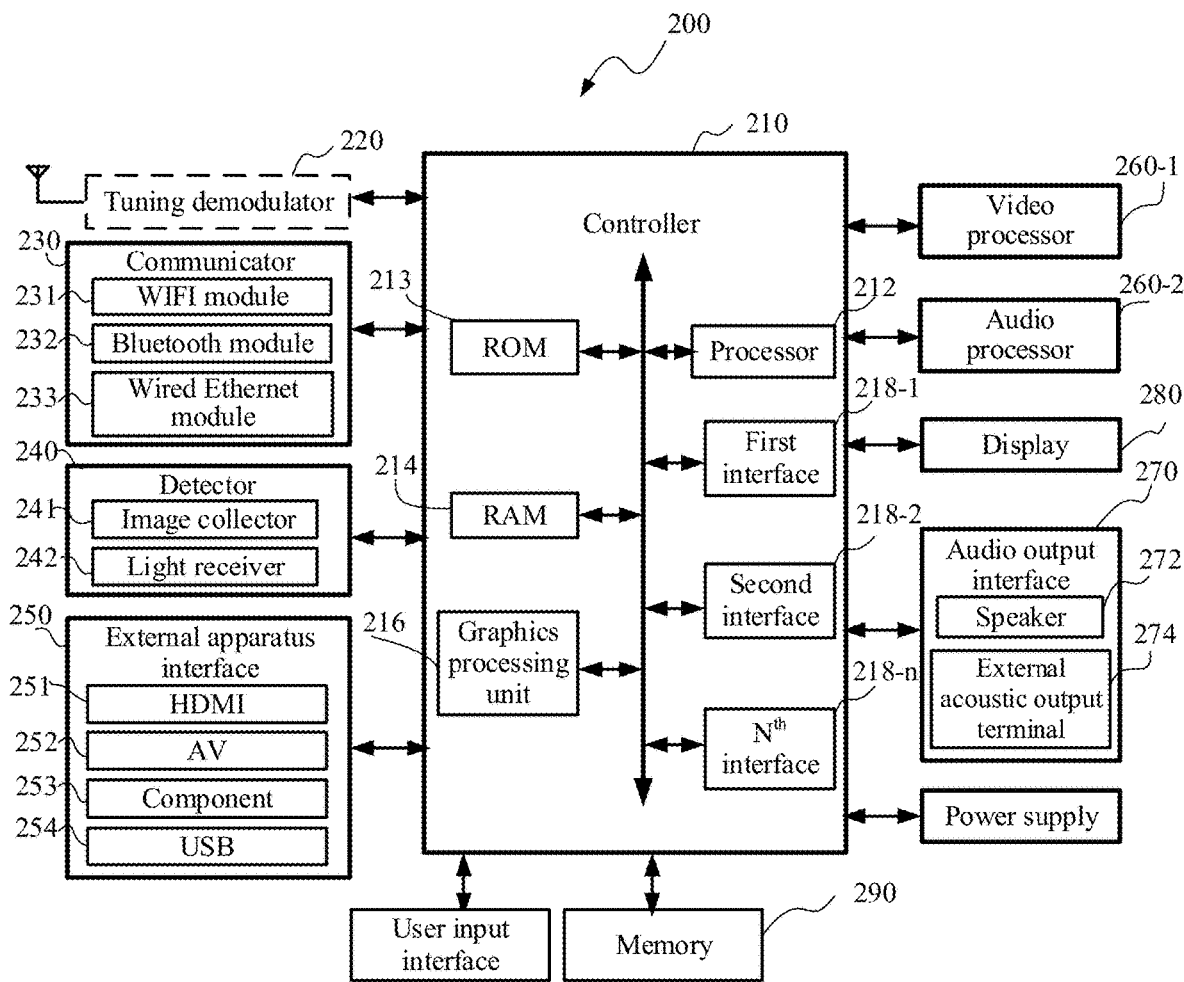
FIG. 2 is a block diagram of hardware configuration of a display apparatus 200 according to an exemplary embodiment.

FIG. 2 is a block diagram of hardware configuration of the display apparatus 200 according to an exemplary embodiment. As shown in FIG. 2, the display apparatus 200 may include a tuning demodulator 220, a communicator 230, a detector 240, an external apparatus interface 250, a controller 210, a memory 290, a user input interface, a video processor 260-1, an audio processor 260-2, a display 280, an audio output interface 272, and a power supply.

The tuning demodulator 220 receives broadcast television signals in a wired or wireless mode, may perform modulation-demodulation processing such as amplification, frequency mixing and resonance, and is configured to demodulate an audio and video signal carried in a frequency of a television channel selected by the user and additional information (for example, an EPG data signal) from a plurality of wireless or cable broadcast television signals.

The tuning demodulator 220 may respond to the frequency of the television channel selected by the user and the television signal carried by the frequency according to the user's selection under control of the controller 210.

According to different broadcast systems of the television signals, the tuning demodulator 220 may have multiple ways to receive signals, such as terrestrial broadcasting, cable broadcasting, satellite broadcasting or Internet broadcasting; according to different modulation types, the tuning demodulator may adopt a digital modulation mode or an analog modulation mode; and according to the different types of received television signals, an analog signal and a digital signal may be demodulated.

In some other exemplary embodiments, the tuning demodulator 220 may also be in an external device, such as an external set top box. In this way, the set top box outputs the television audio-video signals after modulation and demodulation to input the signals into the display apparatus 200 through the external apparatus interface 250.

The communicator 230 is a component configured to communicate with an external device or an external server according to various communication protocol types. For example, the communicator 230 may include a WIFI module 231, a Bluetooth communication protocol module 232, a wired Ethernet communication protocol module 233, and other network communication protocol modules or near field communication protocol modules.

The display apparatus 200 may establish control signals and data signals connection with an external control device or a content providing device through the communicator 230. For example, the communicator may receive a control signal of the remote control 100 according to control of the controller.

The detector 240 is a component for the display apparatus 200 to collect a signal of an external environment or a signal interacting with the outside. The detector 240 may include an light receiver 242, which is a sensor for collecting an environment light intensity, and may be changed the display parameter accordingly by collecting the environment light; and the detector 240 may further include an image collector 241, such as a camera or a webcam, which may be configured to collect an external environment scene and configured to collect attributes of the user or interact gestures with the user, so as to adaptively vary display parameters, recognize gestures of the user, and realize an interactive function with the user.

In some other exemplary embodiments, the detector 240 may further include a temperature sensor, for example, the display apparatus 200 may self-adaptively adjust a display color temperature of an image by sensing an environment temperature. Exemplarily, when the environment temperature is high, the color temperature of the image displayed by the display apparatus 200 may be adjusted to a relatively cold tune; and when the environment temperature is low, the color temperature of the image displayed by the display apparatus 200 may be adjusted to a relatively warm tune.

In some other exemplary embodiments, the detector 240 may further include a sound collector, such as a microphone, which may be configured to receive sound of the user, including a voice signal of a control instruction for controlling the display apparatus 200 from the user; or may collect environmental sound for recognizing environmental scene types, so that the display apparatus 200 may be changed according to environmental noise.

The external apparatus interface 250 is a component for providing the controller 210 with controlling over data transmission between the display apparatus 200 and other external devices. The external apparatus interface may be connected with external devices such as a set top box, a game apparatus and a notebook computer in a wired/wireless mode, and may receive data such as a video signal (such as a motion image), an audio signal (such as music), additional information (such as EPGs) of the external devices.

The external apparatus interface 250 may include: any one or more of a high definition multimedia interface (HDMI) interface 251, a composite video blanking synchronization (CVBS) interface 252, an analog or digital component interface 253, a universal serial bus (USB) interface 254, or a RGB (red, green, blue) interface (not shown in the figure).

The controller 210 is configured to control working of the display apparatus 200 and respond to operations of the user by running various software control programs (such as an operating system and various applications) stored on the memory 290.

As shown in FIG. 2, the controller 210 includes a random access memory (RAM) 214, a read only memory (ROM) 213, a graphics processing unit 216, a central processing unit (CPU) 212, a communication interface 218, and a communication bus. The RAM 214, the ROM 213, the graphics processing unit 216, the CPU 212 and the communication interface 218 are connected through the communication bus.

The ROM 213 is configured to store various system start-up instructions. For example, when a power-on signal is received, a power source of the display apparatus 200 begins to start, the CPU 212 runs the system start-up instruction in the ROM to copy an operating system stored in the memory 290 into the RAM 214 so as to initialize the operating system. After the operating system is started, the CPU 212 copies the various applications in the memory 290 into the RAM 214 again, and then, begins to start the various applications.

The graphics processing unit 216 is configured to generate various graphic objects, such as an icon, an operating menu, and user input instruction display graphics. The graphics processing unit includes an arithmetic unit, configured to perform computation by receiving various interactive instructions input from the user and display various objects according to a display attribute; and include a renderer, for generating the various objects obtained based on the arithmetic unit and displaying a rendered result on the display 280.

The CPU 212 is configured to execute the operating system and the application instruction stored in the memory 290 and execute the various applications, data and contents according to the various received interactive instructions, so as to finally display and play the various audio and video contents.

In some exemplary embodiments, the CPU 212 may include a plurality of processors. The plurality of processors may include one main processor and a plurality of or one sub processor.

The communication interface may include a first interface 218-1 to an $n^{th}$ interface 218-$n$. These interfaces may be network interfaces connected to an external device via a network.

The controller 210 may control the overall operation of the display apparatus 200. For example, in response to receiving a user command for selecting a UI object displayed on the display 280, the controller 210 may execute the operation relevant to the object selected by the user command.

The object may be any one of optional objects, such as a hyperlink or an icon. The operation relevant to the selected object may be, for example, an operation of displaying connection to a hyperlink page, document, image and the like, or an operation of launching an application corresponding to the icon. The user command for selecting the UI object may be a command input through various input apparatus (such as a mouse, a keyboard, a touch pad and the like) connected to the display apparatus 200, or a voice command corresponding to a voice spoken by the user.

The memory 290 includes various software modules configured to drive and control the display apparatus 200. For example, the various software modules stored in the memory 290 include: a basic module, a detection module, a communication module, a display control module, a browser module, various service modules, and the like.

Meanwhile, the memory 290 is further configured to store and receive external data and user date, images of all items in various user interfaces, visual effect pictures of focus objects, and the like.

The user input interface is configured to send an input signal of the user to the controller 210, or transmits an output signal from the controller 210 to the user. Exemplarily, the control device (such as the mobile terminal or the remote control) may send the input signals, such as a power signal, a channel selection signal, and a volume adjusting signal, input by the user to the user input interface, and then the input signals are forwarded to the controller by the user input interface; or the control device may receive the output signals such as audios, videos or data, output from the user input interface and processed by the controller, display the received output signals, or output the received output signals in an audio or vibration form.

In some embodiments, the user may input a user command on the graphical user interface (GUI) displayed on the display 280, and then the user input interface receives the user input command through the GUI. Or, the user inputs the user command by inputting specific sound or gesture, and then the user input interface recognizes the sound or the gesture through a sensor so as to receive the user input command.

The video processor 260-1 is configured to receive a video signal, and perform video data processing such as decompression, decoding, scaling, noise reduction, frame rate conversion, resolution conversion and image synthesis according to a standard encoding and decoding protocol of the input signal so as to obtain the video signal directly displayed or played on the display 280.

The display 280 is configured to receive the image signal input from the video processor 260-1 and display a video content, an image and a menu manipulating interface. The display 280 includes a display component configured to present a picture and a driving component for driving image displaying. The displayed video content may be the video in the broadcast signal received by the tuning demodulator 220, or the video content input by the communicator or an external device interface. The display 280 simultaneously displays the user manipulating interface UI generated in the display apparatus 200 and configured to control the display apparatus 200.

According to different types of the display 280, the display 280 further includes the driving component for driving display. Or, if the display 280 is a projection display, it may further include a projection apparatus and a projection screen.

The audio processor 260-2 is configured to receive an audio signal and perform audio data processing such as decompression, decoding, noise reduction, digital-to-analog conversion and enlarging processing according to a standard encoding and decoding protocol of the input signal so as to obtain an audio signal capable of being played in a speaker 272.

The audio output interface 270 is configured to receive the audio signal output by the audio processor 260-2 under control of the controller 210. The audio output interface may include the speaker 272, or an external acoustic output terminal 274 output to a sound terminal of an external device, such as an external acoustic terminal or an earphone output terminal.

In some other exemplary embodiments, the video processor 260-1 may include one or more chips. The audio processor 260-2 may also include one or more chips.

In some other exemplary embodiments, the video processor 260-1 and the audio processor 260-2 may be separate chips, or be integrated in one or more chips together with the controller 210.

The power supply is configured to provide electric power by an external power source for the display apparatus 200 as power supply support under control of the controller 210. The power supply may include a built-in power supply circuit installed in the display apparatus 200, or a power source installed outside the display apparatus 200, such as a power port providing an external power source in the display apparatus 200.

Figure 3:
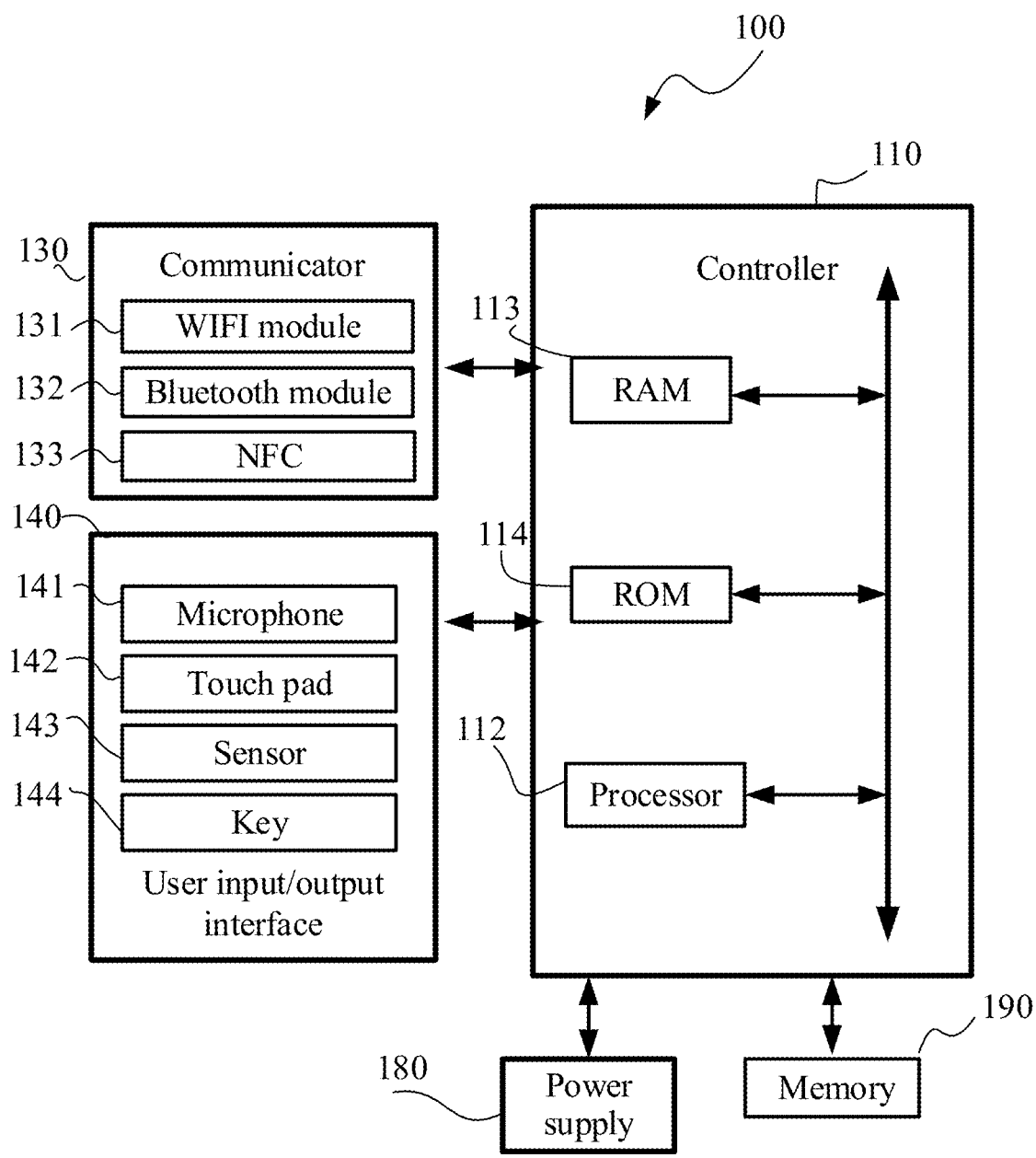
FIG. 3 is a block diagram of hardware configuration of a control device 100 according to an exemplary embodiment.

FIG. 3 is a block diagram of hardware configuration of the control device 100 according to an exemplary embodiment. As shown in FIG. 3, the control device 100 includes a controller 110, a communicator 130, a user input/output interface 140, a memory 190 and a power supply 180.

The control device 100 is configured to control the display apparatus 200, may receive a command input from the user and convert the command into an instruction that can be recognized and responded by the display apparatus 200, and plays an interaction intermediary role between the user and the display apparatus 200. For example, the user operates channel +/− keys on the control device 100, and the display apparatus 200 responds to the channel +/− operations.

In some embodiments, the control device 100 may be in intelligent device. For example, the control device 100 may install various applications for controlling the display apparatus 200 according to user demands.

In some embodiments, as shown in FIG. 1, after being installed with applications for manipulating the display apparatus 200, the mobile terminal 100B or other intelligent electronic devices may play similar functions of the control device 100. For example, the user may operate various functional keys or virtual buttons on the graphical user interface provided on the mobile terminal 100B or the other intelligent electronic devices by installing the application, so as to achieve the function of physical keys of the control device 100.

The controller 110 includes a processor 112, an RAM 113, an ROM 114, a communication interface and a communication bus. The controller 110 is configured to control running and operations of the control device 100, communication cooperation between all internal units, and external and internal data processing functions.

Under control of the controller 110, the communicator 130 realizes communications of control signals and data signals with the display apparatus 200. For example, the received user input signal is sent to the display apparatus 200. The communicator 130 may include at least one of communication modules such as a WIFI module 131, a Bluetooth module 132 and a near field communication (NFC) module 133.

As for the user input/output interface 140, the input interface includes at least one of a microphone 141, a touch panel 142, a sensor 143, or a key 144. For example, the user may realize a user instruction input function through motions such as voice, touch, a gesture and pressing; and the input interface converts a received analog signal into a digital signal, converts the digital signal to a corresponding instruction signal, and sends the corresponding instruction signal to the display apparatus 200.

The output interface includes an interface for sending the received user instruction to the display apparatus 200. In some embodiments, the output interface may be an infrared interface or a radio frequency interface. For example, when the infrared signal interface is adopted, the user input instruction needs to be converted into an infrared control signal according to an infrared control protocol, so as to be sent to the display apparatus 200 through an infrared sending module. For another example, when the radio frequency signal interface is adopted, the user input instruction needs to be converted into a digital signal, and then the digital signal is modulated according to a radio frequency control signal modulation protocol and then sent to the display apparatus 200 through a radio frequency sending module.

In some embodiments, the control device 100 includes at least one of the communicator 130 or the output interface. The control device 100 is configured with the communicator 130, such as WIFI, Bluetooth, NFC and other modules, so that the user input instruction may be encoded through a WIFI protocol, or a Bluetooth protocol, or an NFC protocol and then sent to the display apparatus 200.

The memory 190 is configured to store various running programs, data and applications for driving and controlling the control device 100 under control of the controller 110. The memory 190 may store various control signal instructions input from the user.

The power supply 180 is configured to provide running power support for all elements of the control device 100 under control of the controller 110. The power supply may be in the form of a battery and a relevant control circuit.

Figure 4:
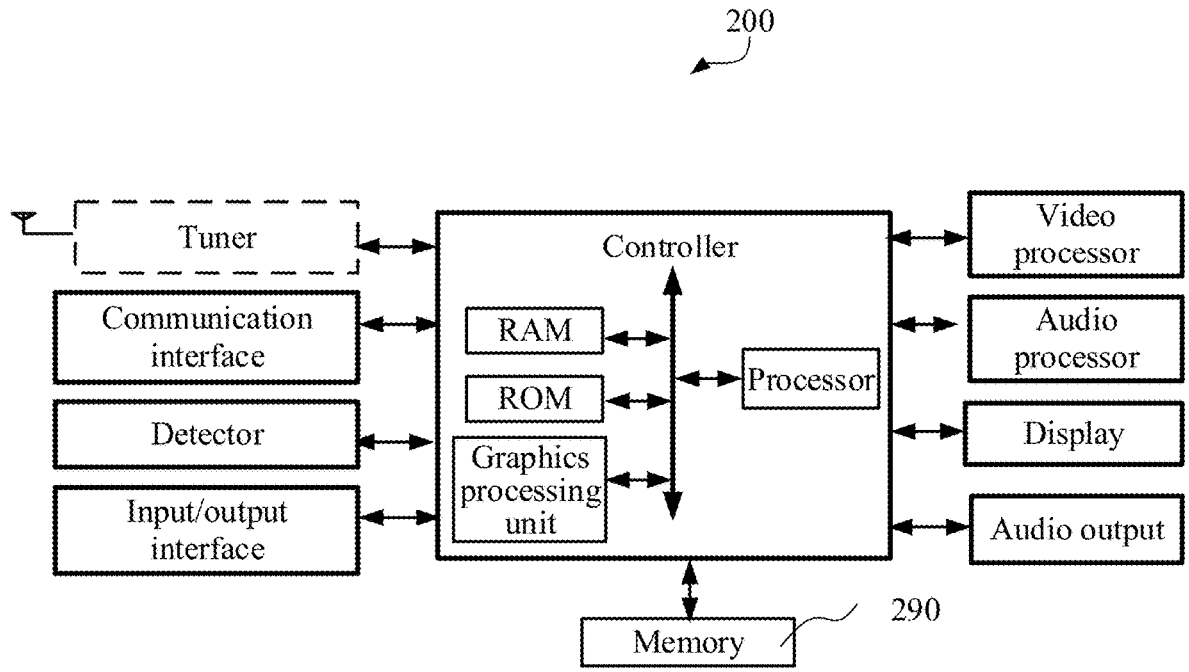
FIG. 4 is a schematic diagram of function configuration of a display apparatus 200 according to an exemplary embodiment.

FIG. 4 is a schematic diagram of function configuration of the display apparatus 200 according to an exemplary embodiment. As shown in FIG. 4, the memory 290 is configured to store an operating system, applications, contents, user data and the like; and the controller 210 controls to drive system running of the display apparatus 200 and respond to various operations of the user. The memory 290 may include a volatile and/or nonvolatile memory.

Figure 5A:
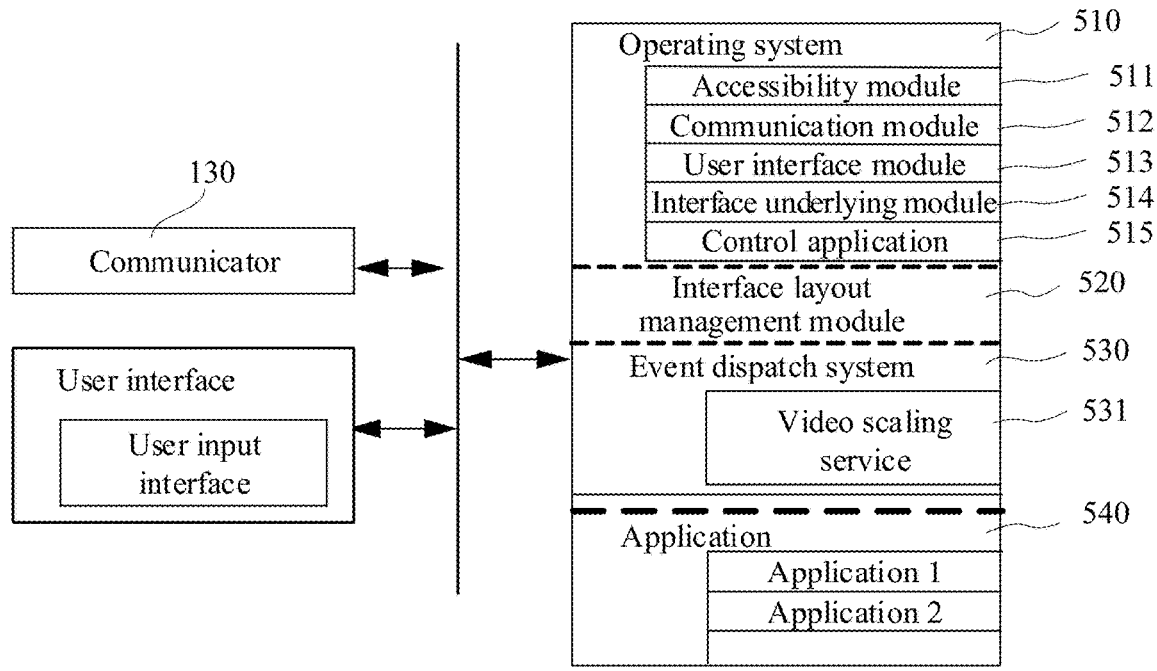
FIG. 5A is a block diagram of software configuration of a display apparatus 200 according to an exemplary embodiment.

FIG. 5A is a block diagram of software configuration of the display apparatus 200 according to an exemplary embodiment. As shown in FIG. 5A, the operating system 510 includes operation software configured to process various basic system services and configured to implement hardware related tasks, and serves as a medium between an application and a hardware component for completing data processing.

An accessibility module 511 is configured to modify or access the application, so as to realize accessibility of the application and operability to its displayed content. A communication module 512 is configured to connect with other peripherals through a relevant communication interface and a communication network. A user interface module 513 is configured to provide an object displaying on the user interface so as to allow all the applications to access and realize user operability. The user interface module 513 further includes a user layer and a video layer, the user layer is configured to provide a plurality of controls capable of realizing user operation, and the video layer is configured to display a video image frame. An interface underlying module 514 includes an underlying module of the user layer and an underlying module of the video layer, where the underlying module of the video layer is configured to provide a video image to-be-displayed for the video layer. A control application 515 is configured to control process management, and includes a running time application and the like.

An interface layout management module 520 is configured to manage a to-be-displayed user interface object, and control user interface layout, so that display of the user interface may respond to user operation.

An event dispatch system 530 may be realized in the operating system 510 or an application layer 540. In some embodiments, on one hand, the event dispatch system is realized in the operating system 510 and realized in the application layer 540 at the same time, configured to monitor various user input events, and will implement one or more groups of processings with predefined operation according to recognition results of various events and subevents.

For example, a video scaling service 531 is run in the event dispatch system, and configured to receive an instruction for triggering a scaling function from the user.

Figure 5B:
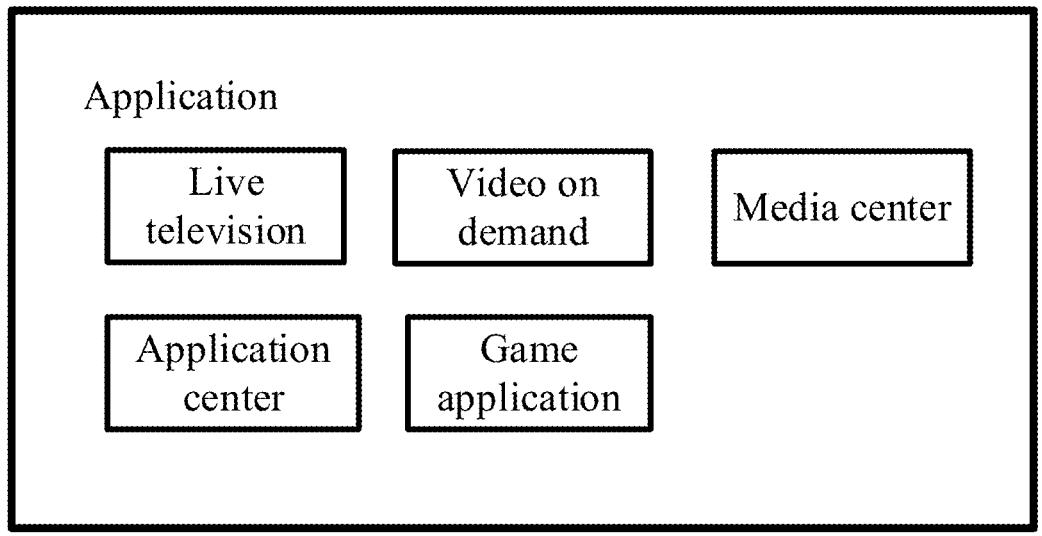
FIG. 5B is a schematic diagram of an application center of a display apparatus 200 according to an exemplary embodiment.

FIG. 5B is a schematic diagram of an application center in the display apparatus 200 according to an exemplary embodiment. As shown in FIG. 5B, the application layer 540 includes various applications on the display apparatus. The applications may include but not limited to one or more applications, such as a live television application, a video on demand (VOD) application, a media center application, an application center and a game application.

The live television application may provide live television programs through different signal sources. For example, the live television application may provide a television signal using input from a cable television, wireless broadcasting, a satellite service or other types of live television services. The live television application may display a video of the live television signal on the display apparatus.

The video on demand application may provide videos from different storage resources. Different from the live television application, video on demand provides video from certain storage sources. For example, the video on demand may come from a server side of cloud storage, and a local hard disk memory including a stored video program.

The media center application may provide various applications for playing the multimedia content. For example, a media center may be different from the live television or video on demand, and a user may access services provided by the media center application.

At least one of the live television application, the video on demand application or the media center application is configured with a scaling function module, configured to respond a scaling instruction triggered by the user and realize a scaling function.

The application center may store various applications. The applications may be a game application or some other applications that are related to the computer system or other devices but can run in the display device. The application center can acquire these applications from different sources, and store them in the local memory, and then the applications can run on the display device.

Figure 6A:
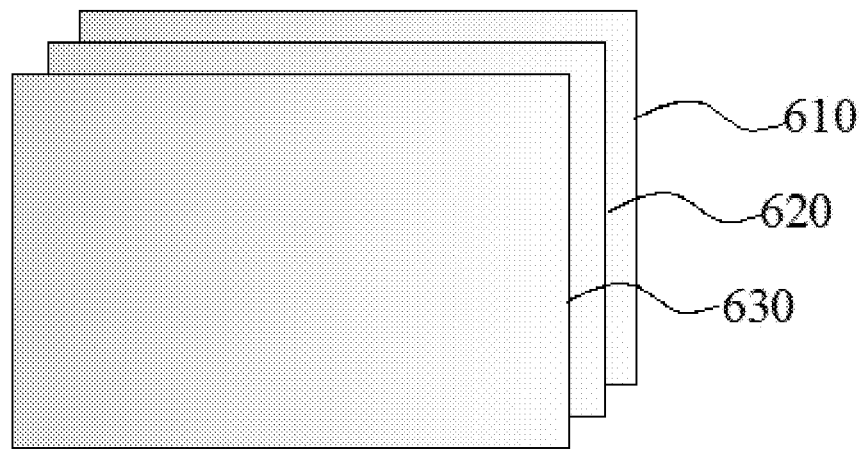
FIG. 6A is a schematic diagram of a user interface of a display apparatus 200 according to an exemplary embodiment.

FIG. 6A is a schematic diagram of a user interface of the display apparatus 200 according to an exemplary embodiment. As shown in FIG. 6A, the user interface is displayed by overlaying of display pictures with different levels, and different layers of image are used for presenting different image contents respectively. For example, a first layer interface 610 may present an item content of a system layer, such as current attribute, and a second layer interface 620 may present item contents of an application layer, such as a web page video, video on demand (VOD) display, and application pictures.

According to different operations of the user on the display apparatus 200, pictures presented on the user interface, as well as image contents, sources and the like presented on each layer are different, therefore, in order to conveniently and clearly illustrate the schemes of the disclosure, the user interface when the display apparatus presents a video image is called user interface in the disclosure.

Figure 6B:
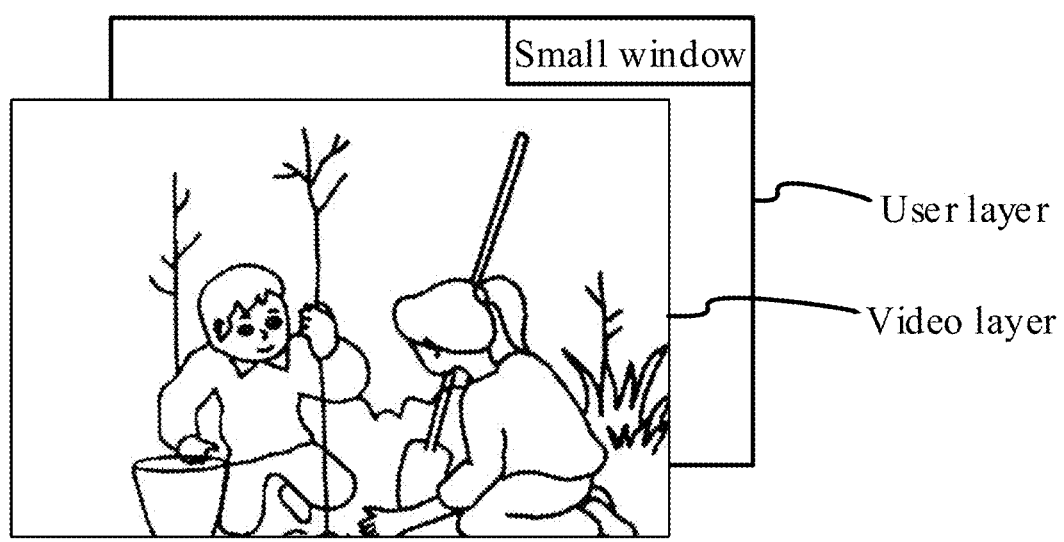
FIG. 6B is a schematic diagram of a user interface of a display apparatus 200 according to an exemplary embodiment.

FIG. 6B is a schematic diagram of a user interface of the display apparatus 200 according to an exemplary embodiment. As shown in FIG. 6B, the user interface at least includes two layer, namely, a video layer and a user layer respectively, the video layer is configured to present frames of video images, and the user layer is at least configured to present some controls which can be clicked by a user, such as a "small window" control.

Further, the user layer may be presented through overlaying of multiple sublayers. Each sublayer is configured to present a part of contents on the user interface, so that other pictures except for the video images are presented in different layers, and a presenting effect is ensured. Exemplarily, a third layer interface 630 is a sublayer of the user layer.

Figure 7A:
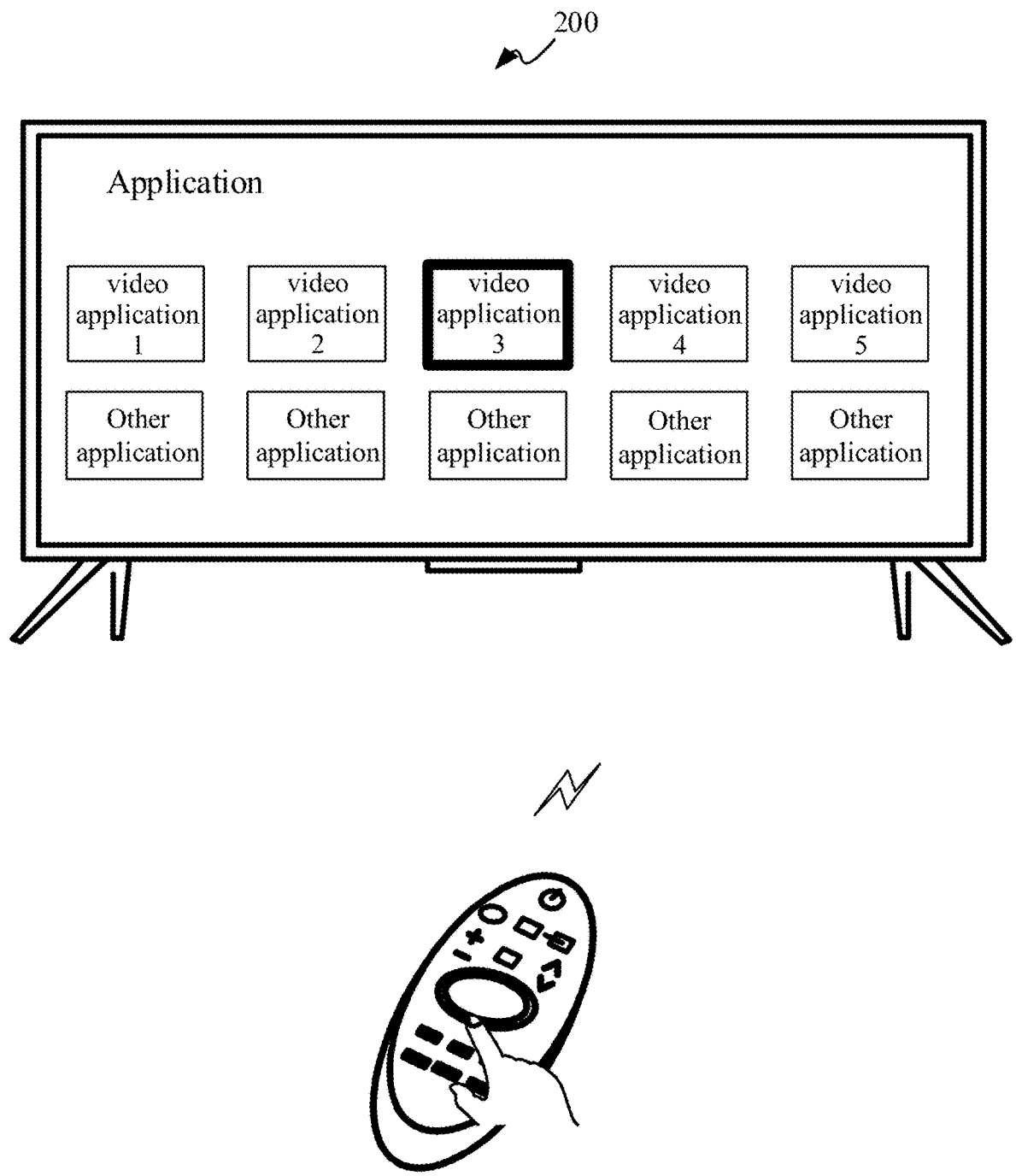
FIG. 7A is a schematic diagram of a user interface when a user selects video display with a video on demand function at an application center.

FIG. 7A is a schematic diagram of a user interface when a user selects a video with a video on demand function at an application center. A video application (such as an X video, and a Y video) is not a system level application, and may be loaded from an application store or be transmitted and installed through an external store device. Or, the video application is a system level application, and presents system parameters for a user. In an example, the video application is installed in the display apparatus in advance, and is presented in the user interface within the application center, and is available for the user to click.

Figure 7B:
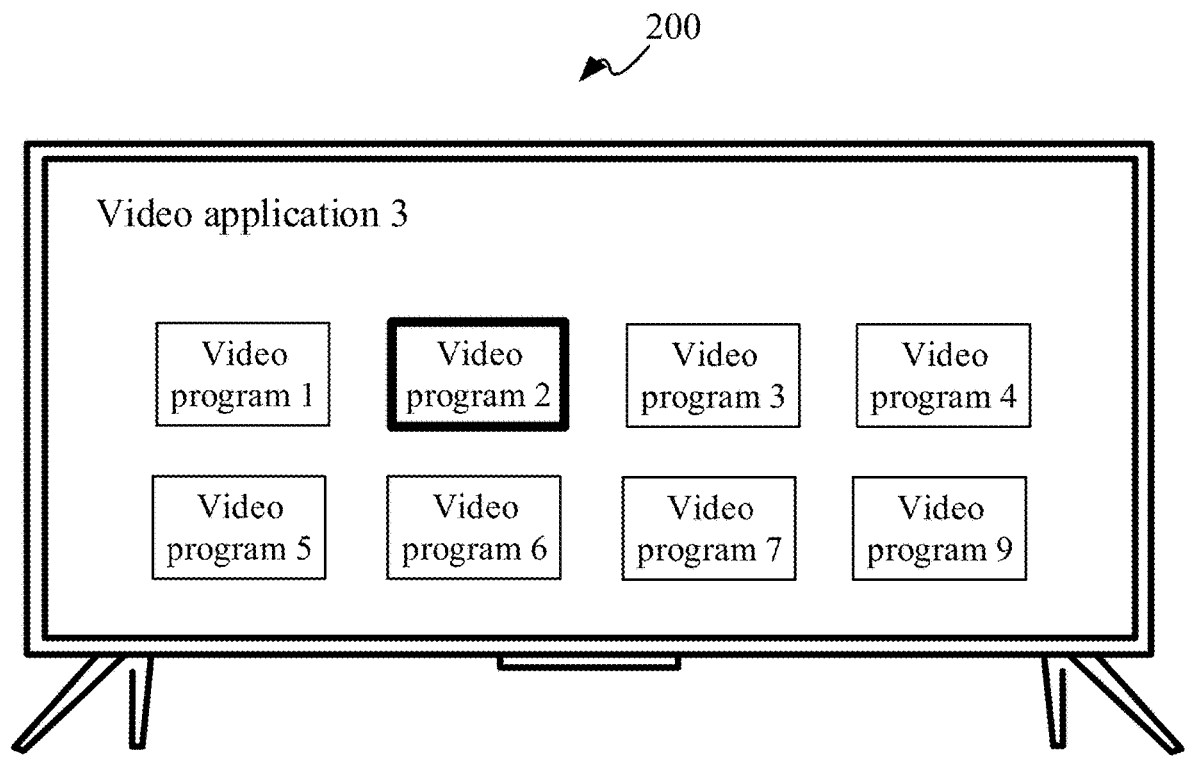
FIG. 7B is a schematic diagram of a user interface when a user selects a video program in a video application.
Figure 7B:
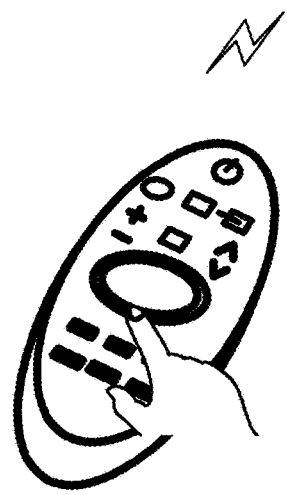

FIG. 7B is a schematic diagram of a user interface when the user selects a video program in a video application. As shown in FIG. 7B, the user interface at the moment provides multiple identifiers of video programs for selection by the user, and when the user selects a video program, a display apparatus starts to play the selected video program.

Figure 7C:
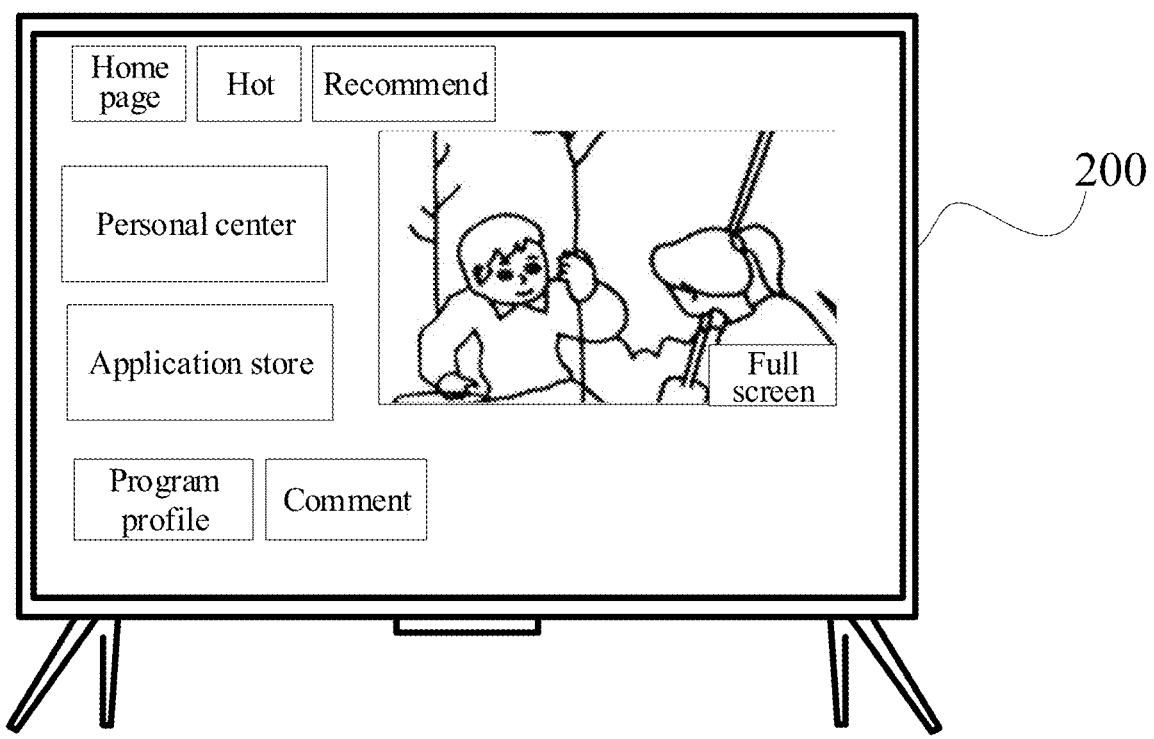
FIG. 7C is a schematic diagram of a user interface when a user selects a video program in a video application.

FIG. 7C is a schematic diagram of a user interface when the user selects a video program in a video application. As shown in FIG. 7C, in the user interface at the moment, the user layer presents controls which can be clicked by the user, such as a "home page", "hot", "recommendation", "personal center", "program profile", "comment", and "full screen"; and the video layer presents video images.

Figure 7D:
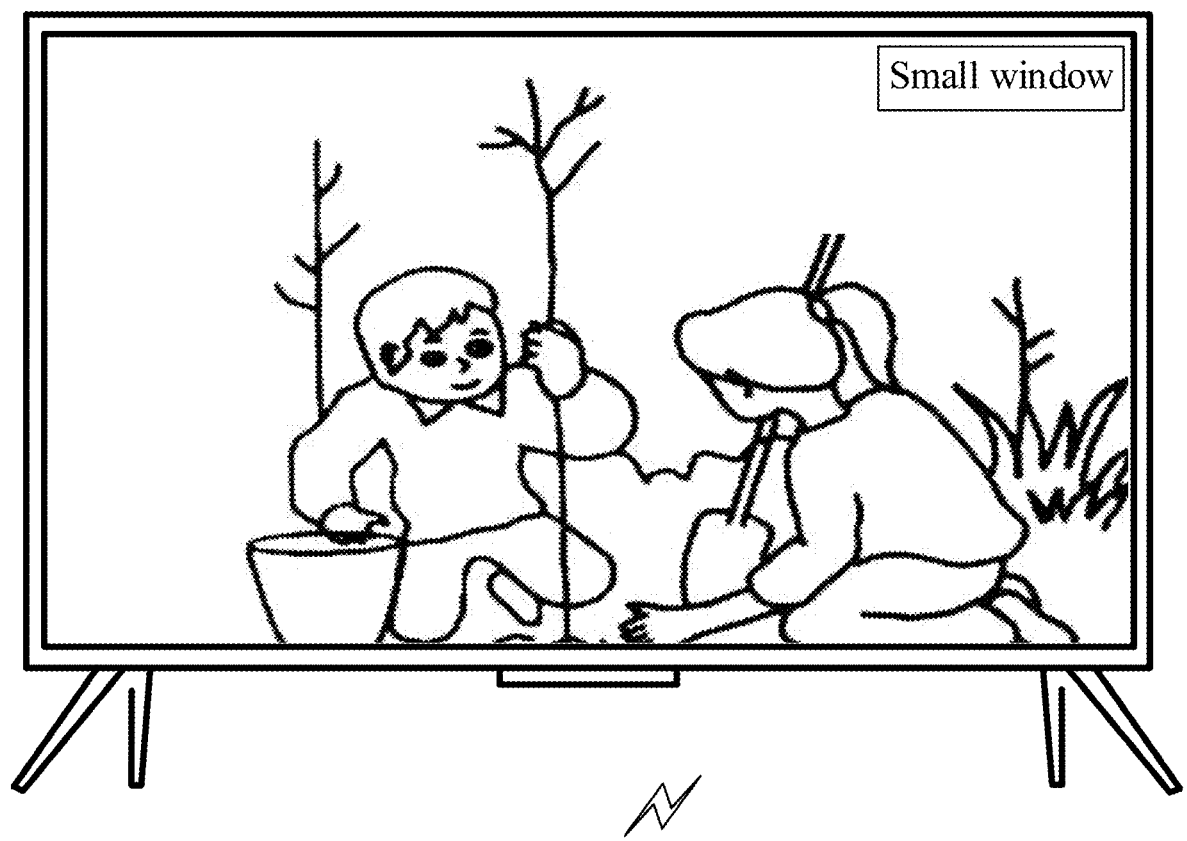
FIG. 7D is a schematic diagram of another user interface when a user clicks "full screen" in the user interface as shown in FIG. 7C.
Figure 7D:
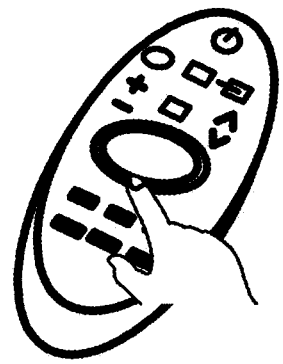

FIG. 7D is a schematic diagram of another user interface when the user clicks the "full screen" in the user interface as shown in FIG. 7C. As shown in FIG. 7D, compared with a present effect of FIG. 7C, in the user interface in this case, the user layer only presents "small window", the area and size of the video image presented by the video layer are varied due to variation of display parameters, particularly obviously, the size of the video image is enlarged.

Figure 7E:
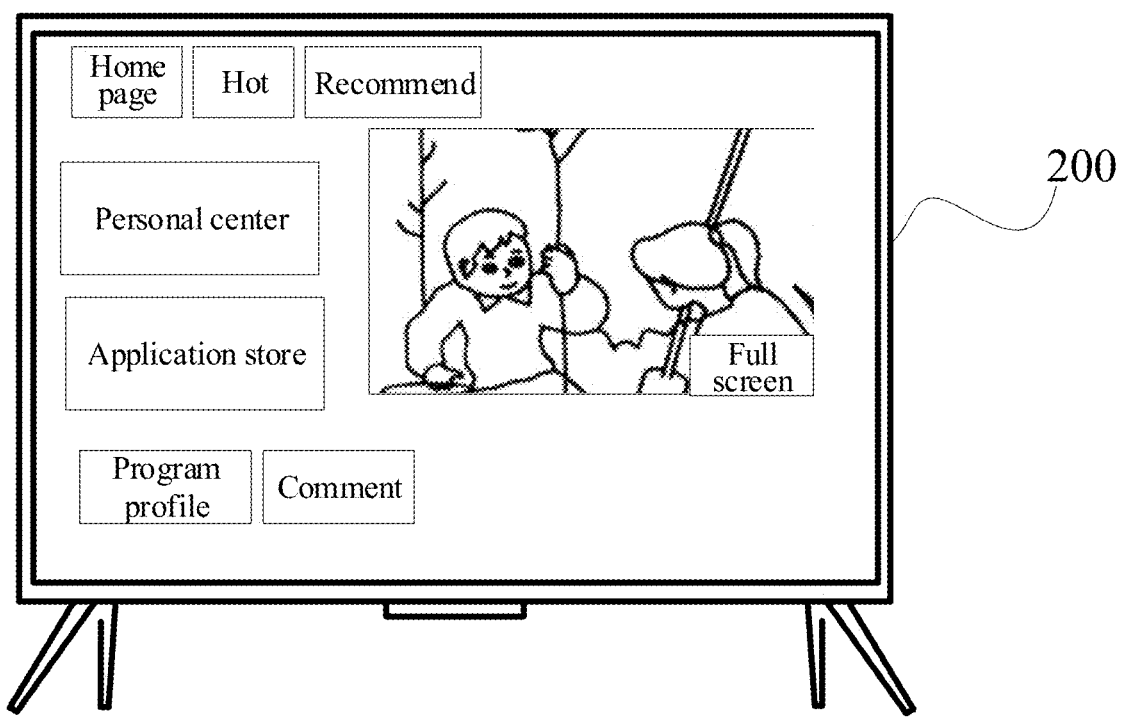
FIG. 7E is a schematic diagram of another user interface when a user clicks "small window" in the user interface as shown in FIG. 7D.

FIG. 7E is a schematic diagram of another user interface when the user clicks the "small window" in the user interface as shown in FIG. 7D. It can be seen that under operation control of the user over the display apparatus, the video image in the user interface is scaled down, the picture of a user layer adapts to variation of the video image so as to present more contents, and finally, a presenting effect of FIG. 7E is consistent with that of FIG. 7C.

As mentioned above, in a video scaling method, phenomena of black-edge or edge cutting often occur in a scaling process due to scaling desynchrony of a video layer and an image layer.

Figure 7F:
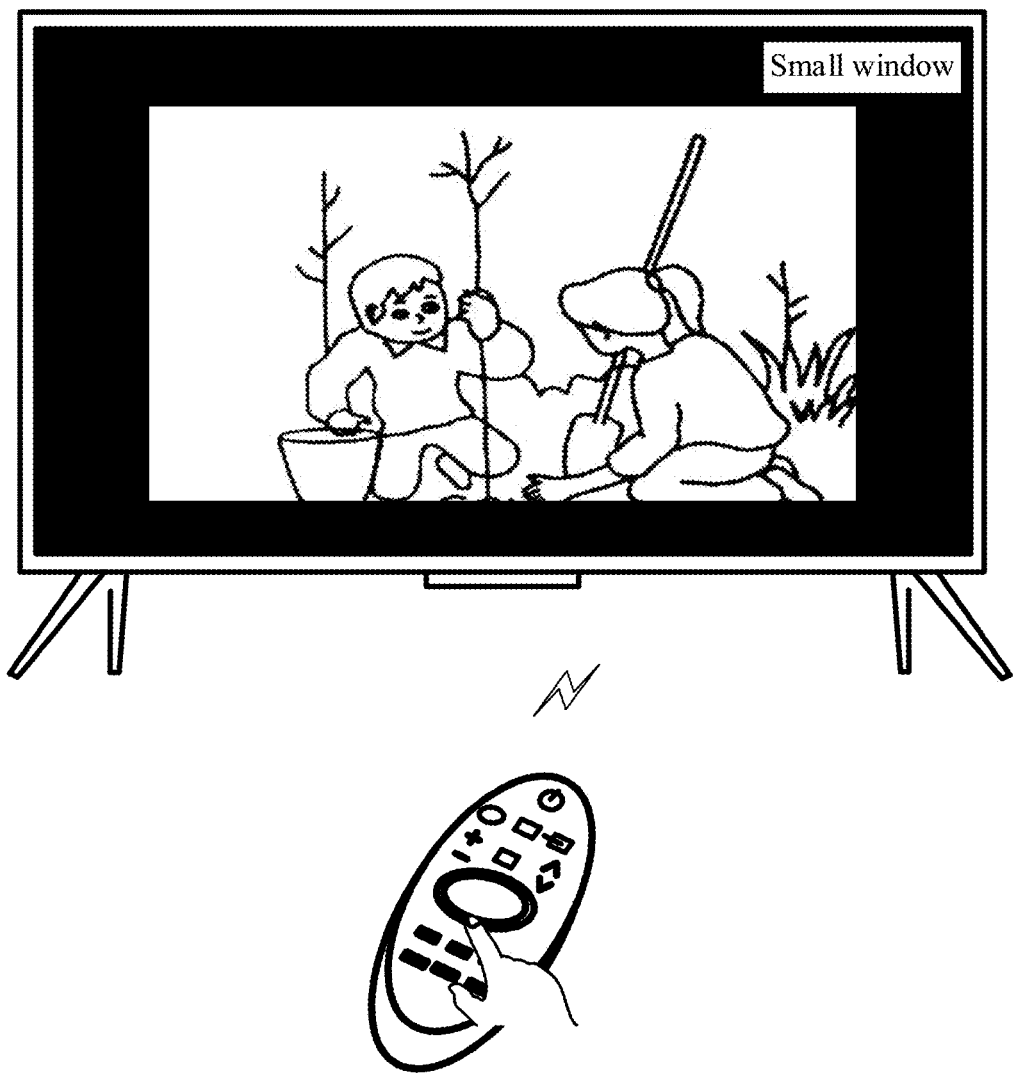
FIG. 7F is a schematic diagram of a black-edge phenomenon occurring in a process that a video image in a user interface is switched from FIG. 7C to FIG. 7D.

FIG. 7F shows a black-edge phenomenon during a process that the video image in the user interface is switched from FIG. 7C to FIG. 7D. Specifically, an enlarging speed of a picture of the user layer is greater than an enlarging speed of the video image, consequently, the sizes of the two layers of pictures displayed simultaneously are unmatched, leading to black edge.

Figure 7G:
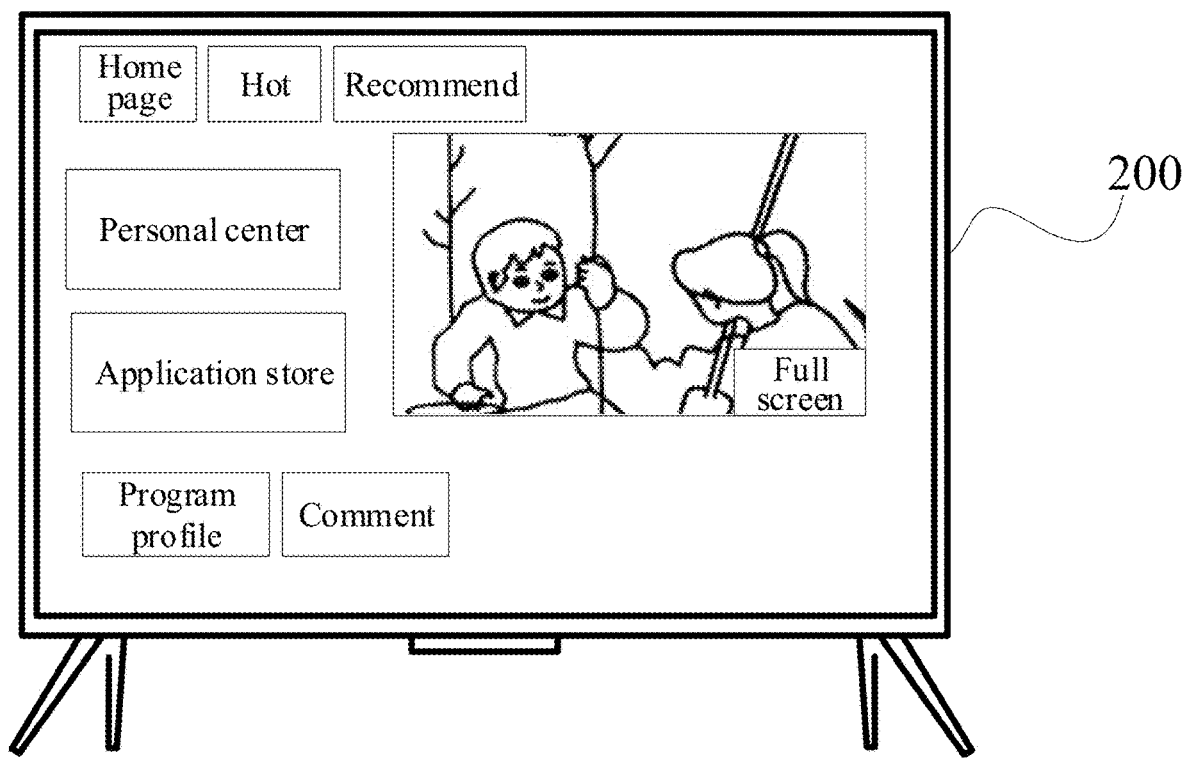
FIG. 7G is a schematic diagram of an edge cutting phenomenon occurring in a process that a video image in a user interface is switched from FIG. 7D to FIG. 7E.

FIG. 7G shows an edge cutting phenomenon during a process that the video image in the user interface is switched from FIG. 7D to FIG. 7E. Specifically, a decreasing speed of a picture of the user layer is greater than a decreasing speed of the video image, consequently, the sizes of the two layers of pictures displayed simultaneously are unmatched, and the picture of the user layer covers the edge part of the video layer, leading to edge cutting.

Figure 8A:
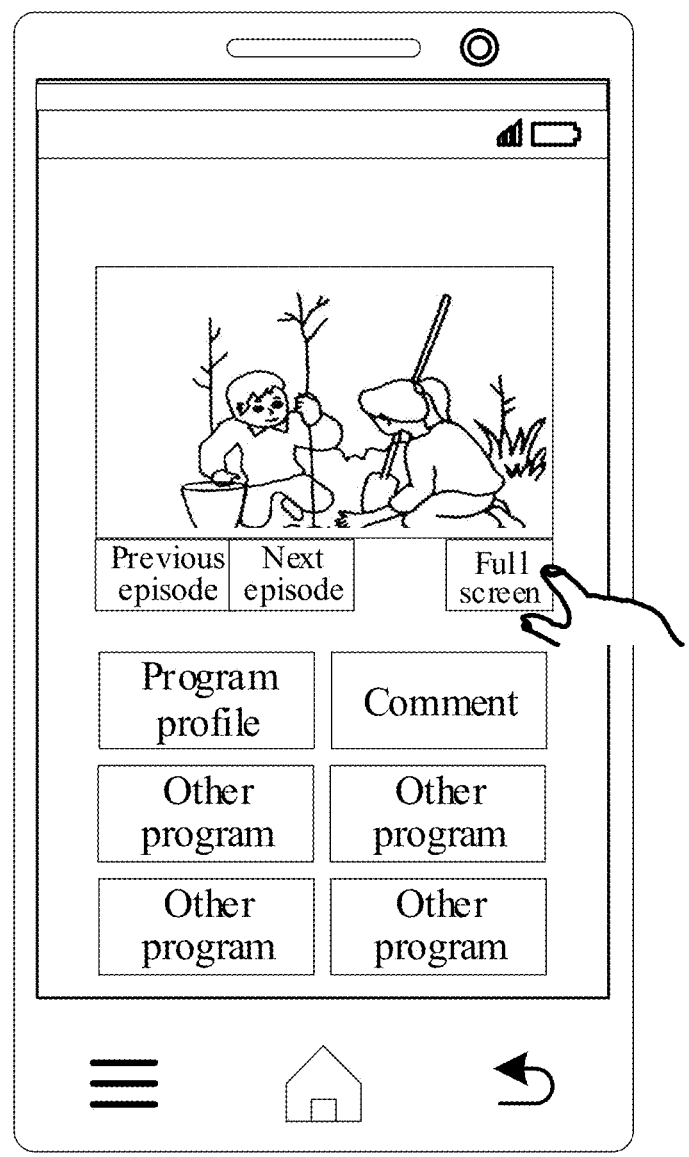
FIG. 8A is another application scene diagram according to an exemplary embodiment.

FIG. 8A is another application scene diagram according to an exemplary embodiment. As shown in FIG. 8A, a mobile terminal runs a video application installed in advance, and a user watches a video in a small window mode.

Figure 8B:
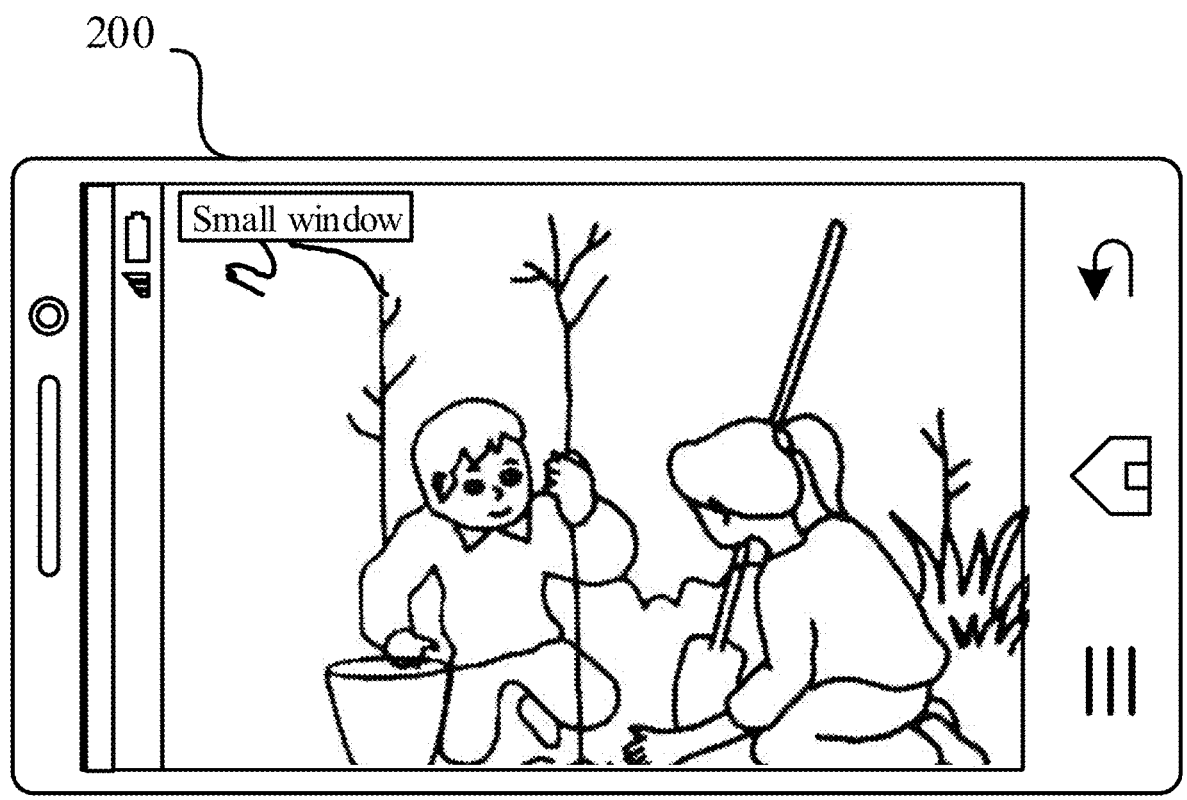
FIG. 8B is a schematic diagram of another user interface when a user clicks "full screen" in the user interface as shown in FIG. 8A.

FIG. 8B is a schematic diagram of another user interface when the user clicks the "full screen" in the user interface as shown in FIG. 8A.

Figure 8C:
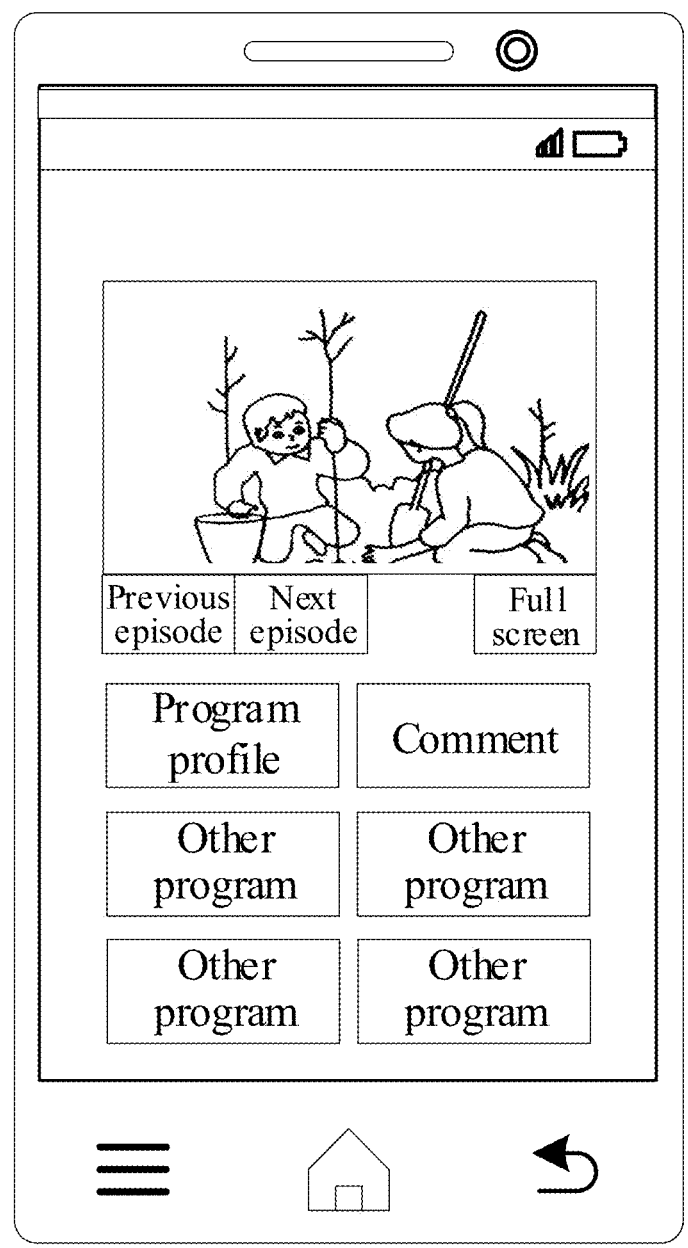
FIG. 8C is a schematic diagram of another user interface when a user clicks a "small window interface" in the user interface as shown in FIG. 8B.

FIG. 8C is another user interface when a user clicks a "small window interface" in the user interface as shown in FIG. 8B. FIG. 8C and FIG. 8A are consistent in presenting effect.

Figure 8D:
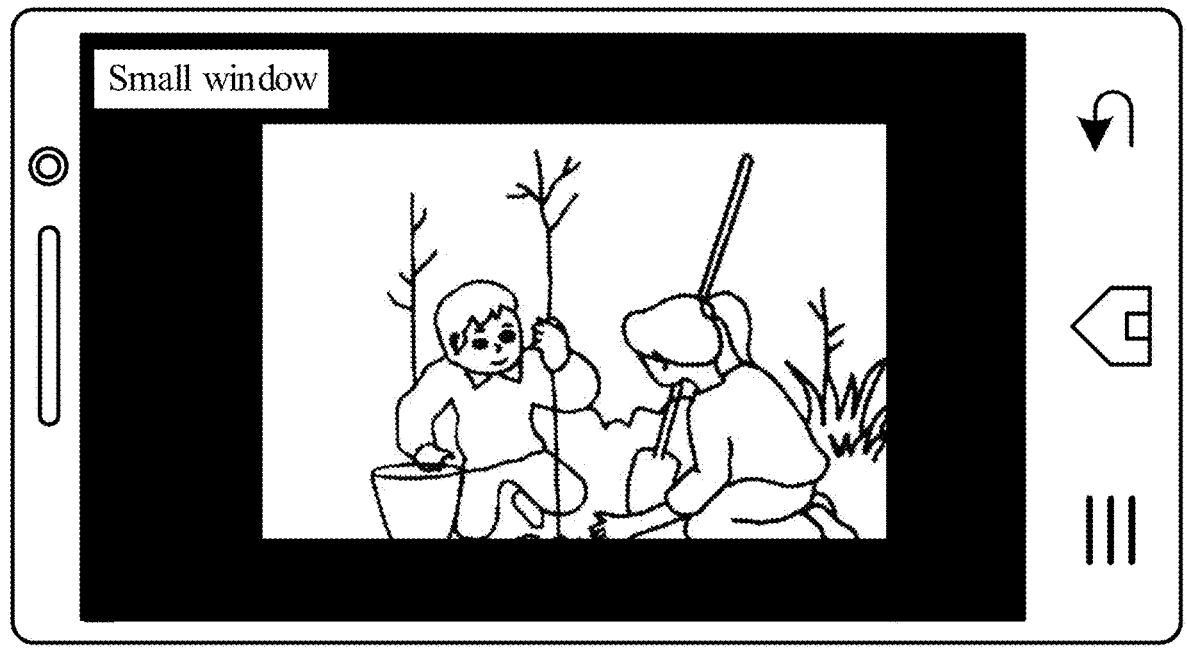
FIG. 8D is a schematic diagram of a black-edge phenomenon occurring in a process that a video image in a user interface is switched from FIG. 8A to FIG. 8B.

FIG. 8D shows a black-edge phenomenon during a process that the video image in the user interface is switched from FIG. 8A to FIG. 8B.

Figure 9:
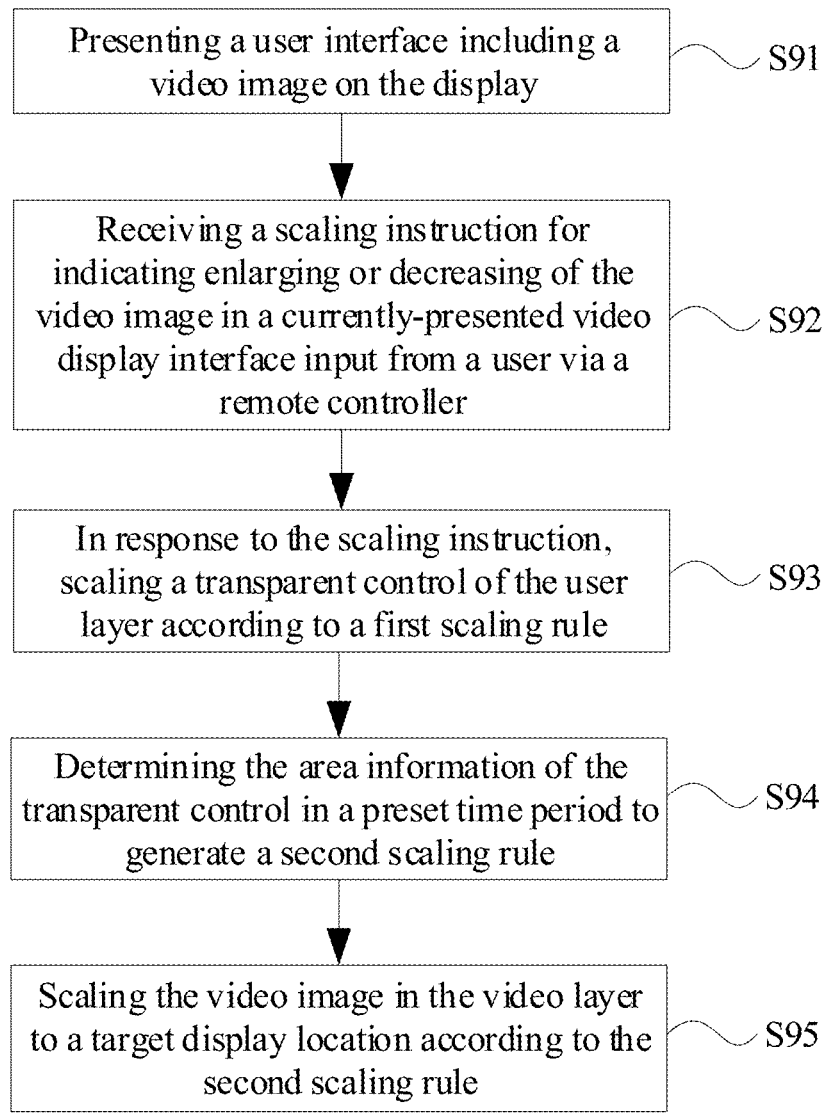
FIG. 9 is a flow diagram of a method implemented by a controller of a display apparatus according to an exemplary embodiment.

In view of the above issues, the disclosure provides a display apparatus. FIG. 9 is a schematic diagram of a hardware structure of a display apparatus according to an exemplary embodiment.

The display apparatus may include a display 280 and a controller 210 in communication with the display 280.

The display 280 is configured to present a user interface, where the user interface includes a first view display region and a second view display region, the first view display region is configured to present a video image of a video layer, and the second view display region is configured to present recommend information of a user layer; and the user layer floats on the video layer, and a control of the user layer at the video image is transparent, so that the video image of the video layer penetrates through the user layer or the video image of the video layer is transparent with regard to the user layer.

The controller 210 is configured to execute presenting of the user interface, specifically including the following.

Step S91: presenting a user interface including a video image on the display.

Before step S91, the user selects a video application at an application center, as shown in FIG. 7A; then the user enters the user interface of the video application, and selects a video program to play at the user interface, as shown in FIG. 7B; and then the user enters the user interface playing the video program, as shown in FIG. 7C or FIG. 7D.

In some embodiments, the display apparatus at least presets two display modes for presenting the video image. In one display mode, the video image is large in size, for example, the video image reaches maximum full-screen. In another display mode, the video image is small in size, for example, the video image reaches minimized small window. Certainly, in each mode, the display size of the video image further needs to adapt to a size of the display, and the like.

Further, in some embodiments, the display apparatus may further presets an intermediate-state display mode, that is, the size of the video image is located between the above maximum state and minimized state.

Step S92, receiving a scaling instruction for indicating enlarging or decreasing of the video image in a currently-presented video display interface input from a user via a remote controller. For example, the scaling instruction may be an instruction for enlarging the video image.

In some embodiments, upon receiving the scaling instruction, whether the scaling instruction is an enlarging instruction or a decreasing instruction is determined.

Step S93, in response to the scaling instruction, scaling a transparent control of the user layer according to a first scaling rule.

The first scaling rule is used for scaling the item or image of the user layer. The process of scaling the picture of the user layer according to the first scaling rule includes: obtaining layer data of the user layer according to the first scaling rule, and displaying the layer data of the user layer.

If the enlarging process is adopted, a transparent window for allowing the video image to penetrate through in the user layer will be enlarged according to the first scaling rule; and if the decreasing process is adopted, the transparent window is decreased according to the first scaling rule. In the scaling process triggered by the user, the transparent control is enlarged or decreased over time, and area information of the transparent window in the user layer is varied accordingly.

It should be noted that display parameters of the video image displayed at the transparent control are matched with the size of the transparent window and the area information of the transparent window in the user layer. That is to say, the display parameters of the video image displayed at the transparent window need to be changed with variation of the transparent window.

Step S94, determining the area information of the transparent control in a preset time period to generate a second scaling rule.

In this step, the controller records the location or area information of the transparent control in the preset time period. For example, there are three frames of user layer data every 40*ms*, and location coordinates of four vertex points or four edges of each of the transparent controls of the three frames of user layer images in a screen are recorded. The second scaling rule is generated according to the three frames of image data, and area information of the transparent control in a fourth frame of image is estimated.

Step S95, scaling the video image in the video layer to a target display location according to the second scaling rule.

In this embodiment, the preset time period is a preset past period before a current time point, for example, a time period before the current time point and distant from the current time point by a preset interval; and the past time period is composed of multiple continuous past time points.

The second scaling rule is used for causing the video window of the video layer and the transparent control to scale in collaboration according to the second scaling rule. The second scaling rule is changed once every the preset time period, and aims to keep consistent with a variation rule of the transparent control.

In this embodiment, the second scaling rule is generated according to the location information of the transparent window in the user layer in the preset past preset time period. Because in the past preset time period, the location information of the transparent control in the user layer corresponds to predetermined display parameters of the video image in the past preset time period, the location information of the transparent window in the user layer in a future certain time point may be estimated according to the location information of the transparent control in the user layer in the preset time period. That is, the display parameters of a to-be-displayed video image in the future certain time point is estimated, namely, the second scaling rule is obtained, and thus the to-be-displayed video image may be cached in advance, so as to avoid delayed display of the video image due to caching time consumption and other reasons, so that it is ensured that the to-be-displayed picture in the video layer and the to-be-displayed picture in the user layer are displayed synchronously without phenomena of edge cutting and black-edge, and a visual experience of the user is more friendly.

In this embodiment, the target display location is a display location determined after the video image is scaled according to the scaling instruction. For example, if the scaling instruction is a decreasing instruction, the target display location may be a video image display location corresponding to a small window play mode, and a location of the transparent window in the user layer under the small window mode as well. If the scaling instruction is an enlarging instruction, the target display location may be a video image display location corresponding to a full-screen mode, and a location of the transparent window in the user layer under the full-screen mode as well.

It can be known from the above that the embodiments of the disclosure provide the display apparatus. After the controller of the display apparatus receives the instruction for enlarging the video image, on one hand, the controller updates the picture of the user layer according to the first scaling rule; on the other hand, the controller obtains the location information of the transparent control in the user layer in the preset time period, generates the second scaling rule, and controls the video image to be enlarged to the target display location according to the second scaling rule. Because in the aforementioned preset time period, the location information of the transparent control in the user layer corresponds to the predetermined display parameters of the video image in the preset time period, the location information of the transparent window in the user layer in the future certain time point can be estimated according to the location information of the transparent control in the user layer in the preset time period. That is, the display parameters of the to-be-displayed video image in the future certain time point is estimated, namely, the second scaling rule is obtained, and thus the to-be-displayed video image may be cached in advance, so as to avoid delayed display of the video image due to caching time consumption and other reasons, so that it is ensured that the to-be-displayed picture in the video layer and the to-be-displayed picture in the user layer are displayed synchronously without phenomena of the edge cutting and the black edge, and the visual experience of the user is better.

The specific implementation of step S94 is illustrated in detail below.

Figure 10:
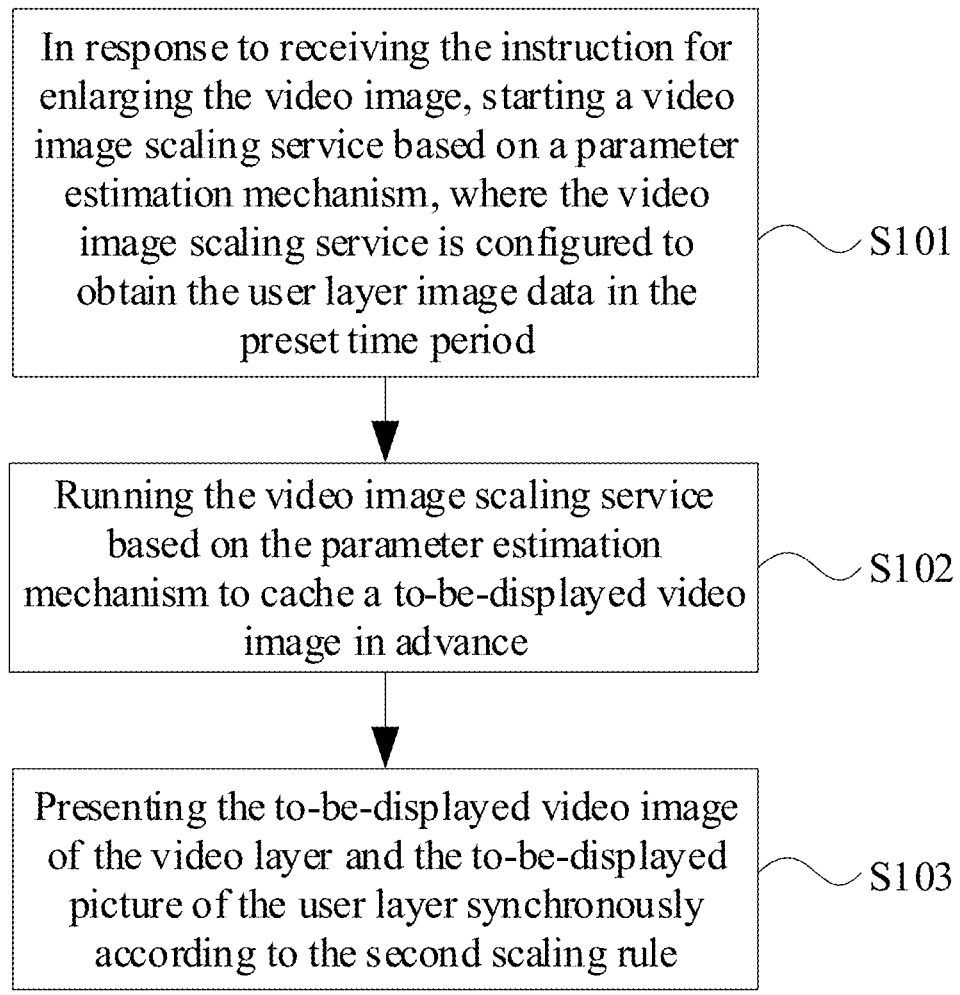
FIG. 10 is a flow diagram of a process of S94 according to an exemplary embodiment.

Referring to FIG. 10, in an embodiment, step S94 further includes the following process.

Step S101, in response to receiving the instruction for enlarging the video image, starting a video image scaling service based on a parameter estimation mechanism, where the video image scaling service is configured to obtain the user layer image data in the preset time period.

The video image scaling service based on the parameter estimation mechanism may be a separate application on the display apparatus. In a case where the video image scaling service is a separate application, the video image scaling service is provided together with the video application by interaction with the video application. The video image scaling service may further be a piece of program configured by the video application, and the video image scaling service is provided independently or can be invoked by calling a system layer program.

The second scaling rule is generated by obtaining the user interface in the preset time period and determining location information of the transparent control in the preset time period.

In some embodiments, there may be at least two types of video image scaling services based on the parameter estimation mechanism. One type of the video image scaling services is suitable for the decreasing process, namely, a video image decreasing service; and the other type of the video image scaling service is suitable for the enlarging process, namely, a video image enlarging service.

The video image decreasing service based on the parameter estimation mechanism is started in response to the decreasing instruction in some embodiments.

The video image enlarging service based on the parameter estimation mechanism is started in response to the enlarging instruction in some embodiments.

Step S102, running the video image scaling service based on the parameter estimation mechanism to cache a to-be-displayed video image in advance.

At the same time, the to-be-displayed picture of the user layer will also be cached according to a preset caching mechanism.

It should be noted that the to-be-displayed video image is cached in advance by the video image scaling service according to the estimate display parameters, so that caching time consumption may be compensated, and delayed display of the picture of the video layer relative to the picture of the user layer is further avoided.

In some embodiments, after the video image scaling service based on the parameter estimation mechanism is started, the video image scaling service based on the parameter estimation mechanism will run continuously till the cached to-be-displayed video image conforms to a target display mode.

The target display mode is one of a plurality of display modes preset by the display apparatus. For example, if the scaling instruction is a decreasing instruction, the target display mode may be the small window mode; and if the scaling instruction is an enlarging instruction, the target display mode may be the full-screen mode.

It should be noted that whether the cached to-be-displayed video images conform to display parameters corresponding to the target display mode may be determined according to the display parameters estimated by the video image scaling service.

The estimation service determines the location information of the transparent control in the predetermined time period, generates a corresponding relationship based on the time and the location, and calculates a scaling speed.

Step S103, presenting the to-be-displayed video image of the video layer and the to-be-displayed picture of the user layer synchronously according to the second scaling rule.

When the scaling speed is calculated, the second scaling rule is calculated according to the scaling speed, and the video image of the video layer is controlled to be scaled to the target display location according to the second scaling rule.

The specific implementation of steps S102 and S103 will be further illustrated in detail below.

FIG. 10 is a flow diagram of a process of step S103. As shown in FIG. 10, after the video image decreasing service based on the parameter estimation mechanism runs, the following steps will be executed.

Step S111, obtaining predetermined display parameters corresponding to at least two time points in the preset time period according to a current time point.

In the scaling process of the video image, the display parameters such as the size and reference point coordinates of the video image are continuously changed as time goes on. The reference point coordinates are used for determining a display location of the video image in the video layer, and they may be coordinates of a vertex at a top left corner or a central point of the video image in the video layer. When the reference point coordinate and the size of the video image are determined, a display effect of the video image on the video layer is also determined accordingly.

The predetermined display parameters refer to parameters issued by the video application to an underlying module of the video layer in the scaling process, so that the underlying module caches the corresponding to-be-displayed picture according to the parameters and displays the to-be-displayed picture in the video layer. The predetermined display parameters may specifically include a predetermined display height, a predetermined display width, and predetermined reference point coordinate.

According to a scaling implementation method, the continuous scaling process may be further described as: the video application issues variable predetermined display parameters to the underlying module of the video layer at n continuous time points in sequence. One time point corresponds to one set of display parameters, that is, corresponds to one frame of video image. The underlying module caches the corresponding video images according to the predetermined display parameters, at the video layer, the video images with the different display parameters are continuously displayed in sequence; at the same time, the user layer will also load and display their corresponding pictures, so as to adapt to scaling of the video image, so that a smooth continuous enlarging or continuous scaling process is presented for the user. It can be understood that value of n depends on a frame rate of the video, specifically, the greater the frame rate is, the greater n is; and the smaller the frame rate is, the smaller n is.

The user may trigger the scaling process by clicking a corresponding control on the user layer. The video application responds to user's click to issue the predetermined display parameters corresponding to each time point to the underlying module of the video layer in sequence in the above n time points.

Issue of the parameters has strict timing and order, therefore, the current time point may be understood as a past time point closet to the current time, and the predetermined display parameters corresponding to the current time point is the parameters issued at that past time point.

In this embodiment, step S111 aims to obtain display parameters for estimating a future time point (namely, a time point after the current time point) from the predetermined display parameters issued by the application, namely, the predetermined display parameters corresponding to the past time point. A parameter variation law indicated by the display parameters corresponding to the closer time point is more precise; therefore, in this embodiment, each time point is associated with one time period, namely, the preset time period; and the interval between the time point and the time period is made to be small enough. Thus, as for the current time point, if the parameters for estimating the future time point are obtained from the preset time period, the parameter variation law indicated by these parameters is more informative for an actual variation law, and thus accuracy of an estimate result in step S112 may be improved to some degree.

The preset time period comprises multiple time points, for example, the time period [ti-m, ti] comprises m+1 time points. In step S111, according to the current time point, the preset time period associated with the current time point may be determined, and then the predetermined display parameters corresponding to the at least two time points in the time period are further determined and obtained.

As an example, the current time point is a right limit of the preset time period associated with the current time point. For example, the current time point is ti, the associated time period is [ti-m, ti]. In step S111, the predetermined display parameters corresponding to the current time point and at least one time point in the preset time period before the current time period are obtained; that is, the obtained predetermined display parameters are the predetermined display parameters corresponding to the current time point ti, and the predetermined display parameters corresponding to at least one time point in [ti-m, ti). According to this implementation, the predetermined display parameters corresponding to the current time point is configured to estimate the display parameters of the future time point(s), thereby further improving accuracy of the estimate result.

Certainly, in other implementations, the predetermined display parameters corresponding to more than two time points may adopt, which is not limited in the disclosure.

Through step S111, the issued predetermined display parameters corresponding to at least part of the time points are obtained, and data for indicating a parameter variation trend of the scaling process is selected as much as possible, so that in the subsequent step, the variation trend indicated by these parameters is utilized to estimate the display parameters corresponding to the future time points.

Step S112, generating a display parameter estimate value corresponding to a target time point according to the obtained predetermined display parameters, where the display parameter estimate value is configured to cache the to-be-displayed video image of the target time point by the video layer in advance, and the target time point is a time point after the current time point and goes away from the current time point by a preset interval.

The target time point refers to a future time point going away from the current time point by the preset interval. The interval between the two time points may be measured by the number of the time points existing between the two time points. For example, if j time points exist between the current time point and the target time point, the interval is j.

Step S112 utilizes the predetermined display parameters obtained according to the current time point to generate the display parameter estimate value corresponding to the target time point, so that the underlying module of the video layer may cache the corresponding video image in advance according to the display parameter estimate value. That is to say, in the case where the application only issues the predetermined display parameters corresponding to the current time point, the underlying module of the video layer has cached the video image corresponding to a future time point going away from the current time point by the preset interval. Therefore, an accumulated caching time Σ Δti of n frames of video images can be compensated, the preset frame quantity of video images can further be cached in advance, the problem of display delay of the pictures of the video layer in the related scaling method is solved, and the phenomena of black-edge or edge cutting are avoided.

It should be noted that the value of the preset interval determines the frame quantity of the video images to be cached in advance by the underlying module of the video layer. Specifically, it is assumed that the interval is j, the target time point corresponding to the current time point ti is ti+j. That is to say, after the application issues the predetermined display parameters corresponding to ti, the underlying module of the video layer may cache the $(i+j)^{th}$ frame of video image, rather than $i^{th}$ frame, according to the display parameter estimate value corresponding to the ti+j; so as not to influence real-time display of the $i^{th}$ frame of video image.

Figure 11:
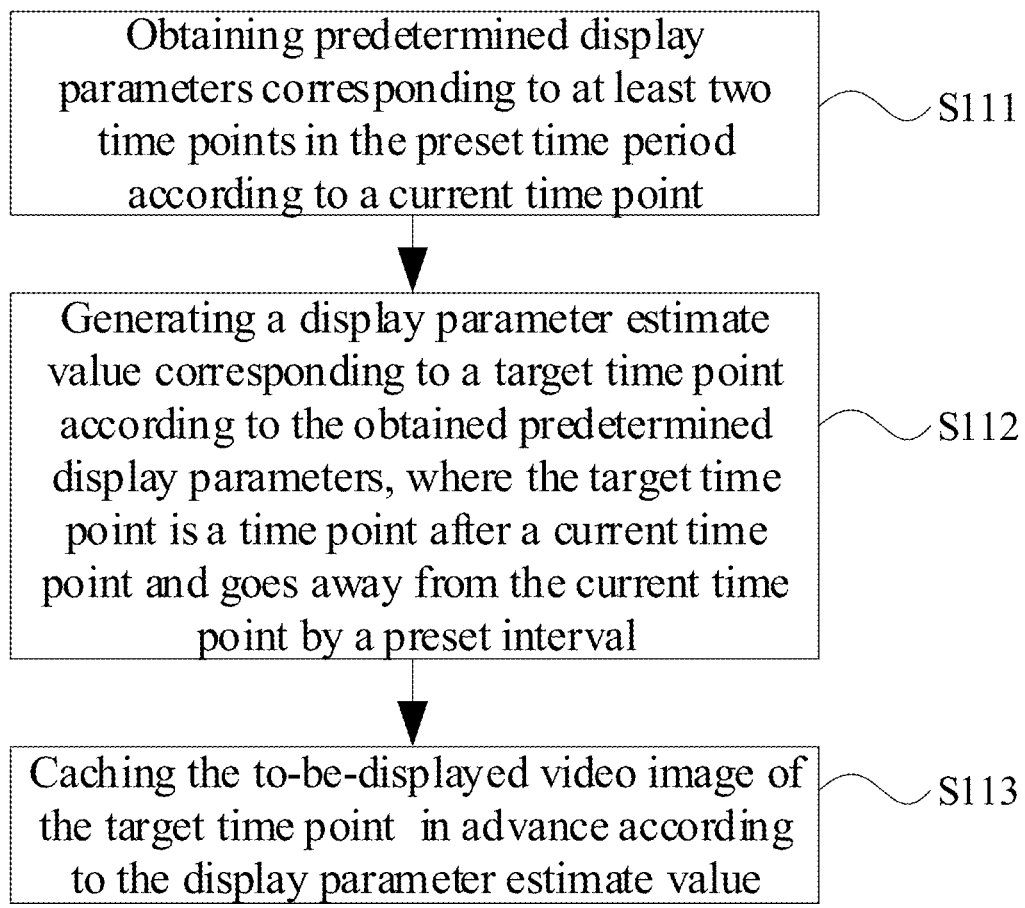
FIG. 11 is a flow diagram of a process of S103 according to an exemplary embodiment.
Figure 12:
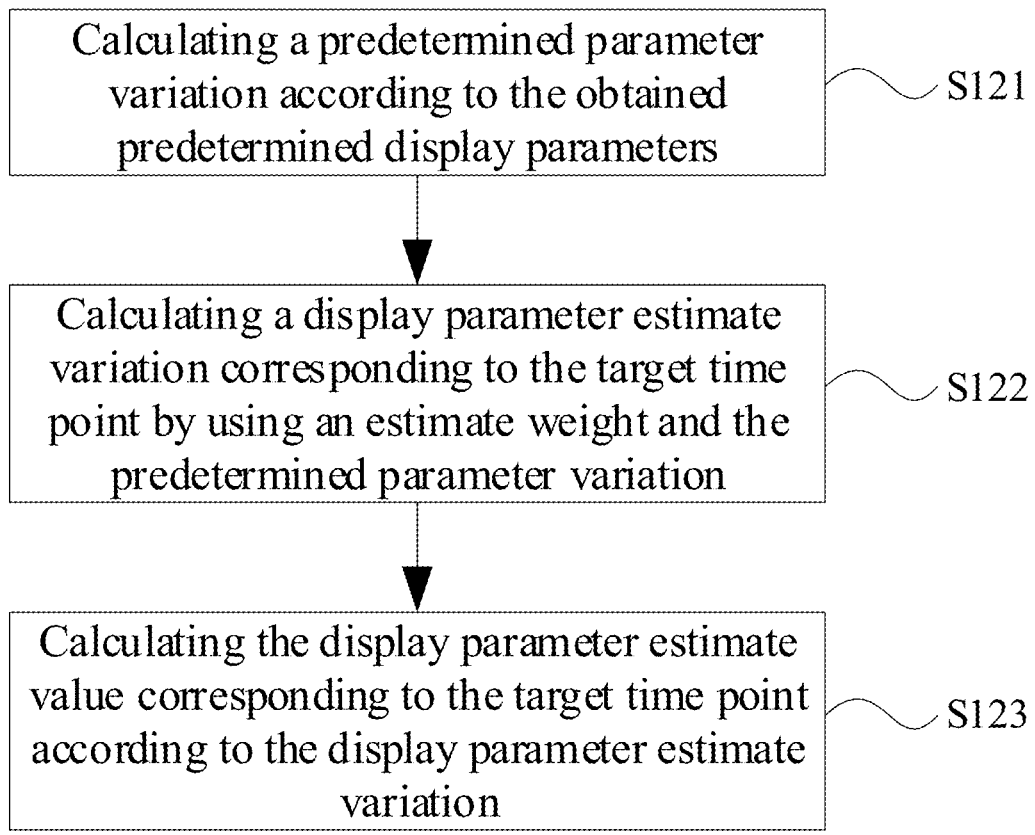
FIG. 12 is a flow diagram of a process of S112 according to an exemplary embodiment.
Figure 13:
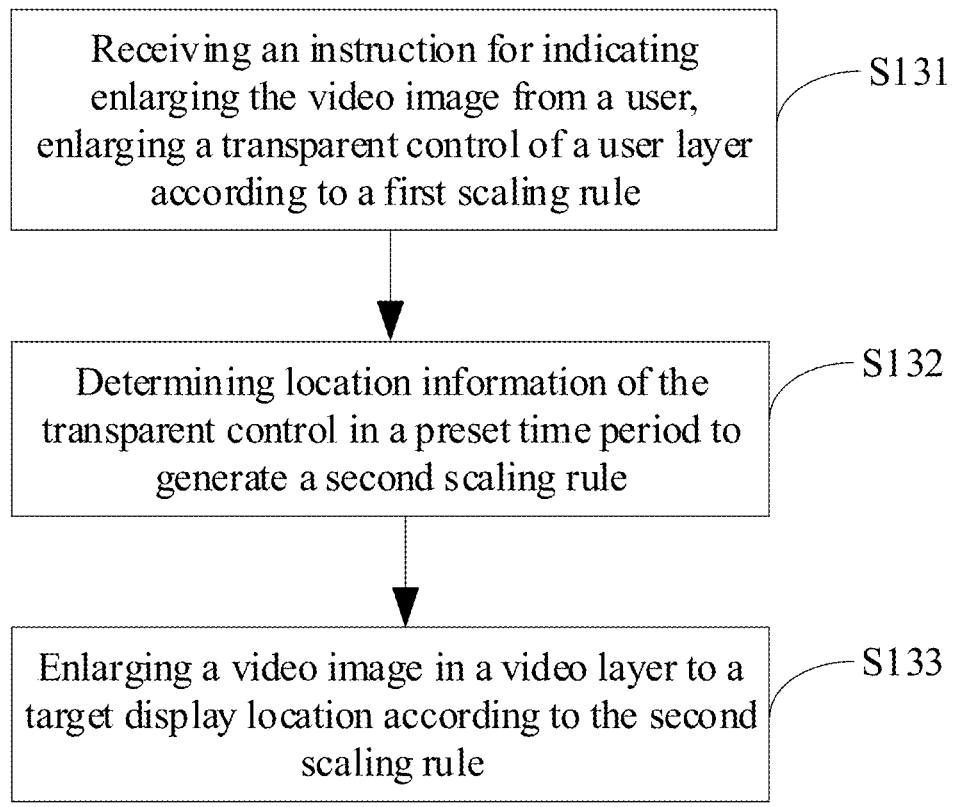
FIG. 13 is a flow diagram of a video image scaling method according to an exemplary embodiment.

As an example, step S112 may further include steps as shown in FIG. 11.

Step S121, calculating a predetermined parameter variation according to the obtained predetermined display parameters.

The predetermined parameter variation may serve as a change in the value of the predetermined display parameter. The variation of the predetermined display parameters include height variation, width variation and the like, therefore, a change in the predetermined display height or a change in the predetermined display width is calculated to serve as the predetermined parameter variation.

If in step S111, the predetermined display parameters corresponding to the current time point and a previous time point are obtained, the predetermined parameter variation may be calculated by using the following formula:

$$\Delta p = \Delta h = h_i - h_{i-1}, \Delta p = \Delta w = w_i - w_{i-1}.$$

Δp represents the predetermined parameter variation, Δh represents a predetermined height variation, $h_i$ represents the predetermined display height corresponding to the current time point, $h_{i-1}$ represents the predetermined display height corresponding to a previous time point, Δw represents a predetermined width variation, $w_i$ represents the predetermined display width corresponding to the current time point, and $w_{i-1}$ represents the predetermined display width corresponding to a previous time point.

Step S122, calculating a display parameter estimate variation corresponding to the target time point by using an estimate weight and the predetermined parameter variation.

The display parameter estimate variation represents an estimate parameter variation of the target time point relative to the current time point. The parameter variation law of the scaling process is not necessarily a linear law, that is, the parameter variation of each time point relative to a previous time point is not constant, therefore, the disclosure adopts an estimate weight to adjust the predetermined parameter variation, so as to obtain the display parameter estimate variation corresponding to the target time point. Specifically, the estimate weight may multiply with the predetermined parameter variation, and its product serves as the display parameter estimate variation.

At the beginning of the scaling process, or, when the current time point is a first time point of the scaling process, a preset initial value for the estimate weight is used to calculate a display parameter estimate variation of a first target time point. In addition, delays caused by the picture of the video layer are different in the enlarging process and the decreasing process, therefore, different initial values for the estimate weight are set for the enlarging process and the decreasing process respectively.

Based on this, if it is determined that the current time point is the first time point of the scaling process, whether the scaling process is the enlarging process or the decreasing process needs to be determined according to display parameters corresponding to an initial point and the predetermined display parameters corresponding to a current time point of the scaling process, so as to select a corresponding initial value for the estimate weight. The initial point refers to a time point when the user triggers the scaling process and the user interface is still in an original state, and the display parameters corresponding to the initial point at least include display parameters in the two modes, full-screen mode and small window mode. Specifically, if a display height corresponding to the initial point is greater than the predetermined display height corresponding to the current time point, it means that there is a decreasing trend, therefore, it is a decreasing process, and otherwise, it is an enlarging process.

If the scaling process is an enlarging process, an initial value for estimate weight corresponding to the enlarging process is selected to calculate the display parameter estimate variation corresponding to a first target time point in the enlarging process. If the scaling process is the decreasing process, an initial value for estimate weight corresponding to the decreasing process is selected to calculate the display parameter estimate variation corresponding to a first target time point in the decreasing process.

In step S122, using the estimate weight to adjust the predetermined parameter variation, so as to obtain the display parameter estimate variation corresponding to the target time point. The variation trends of the display parameters are different in different time periods of the scaling process, therefore, if a same estimate weight is adopted all the time, the obtained display parameter estimate variation will be not sufficient in accuracy, thereby influencing accuracy of the display parameter estimate value of the target time point.

In order to further improve the accuracy of the estimate result, in an implementation, a counter is used to record the number of use times of the current estimate weight, whether the number of use times of the estimate weight exceeds a preset number of use times is determined before step S122. If yes, a preset update coefficient is assigned to the estimate weight, that is, an estimate weight is equal to the estimate weight multiplied by the preset update coefficient, so that a new estimate weight is used for calculation in step S112; and if not, the current estimate weight is used for calculation of step S112; where the preset update coefficient is generally between 0 and 1.

The above embodiments are adopted to continuously update the estimate weight over time points, so that an estimation mechanism of the disclosure has high flexibility, thereby further improving the accuracy of the display parameter estimate value of the target time point.

Step S123, calculating the display parameter estimate value corresponding to the target time point according to the display parameter estimate variation.

The display parameter estimate variation is an estimate parameter variation of the target time point relative to the current time point. Therefore, in specific implementation, the display parameter estimate value corresponding to the target time point may be calculated by using the following formula:

$$X_G = x_i - \frac{\Delta p}{2};$$

$$y_G = y_i - \frac{\Delta p}{2};$$

$$W_G = W_i + \left(\Delta p \times \frac{W_i}{h_i}\right);$$

$$h_G = h_i + \Delta p.$$

Herein, $x_G$, $y_G$, $w_G$ and $h_G$ respectively represent an estimation reference horizontal ordinate, an estimation reference vertical ordinate, a display width estimate value and a display height estimate value corresponding to the target time point; $x_i$, $y_i$, $w_i$ and $h_i$ respectively represent a predetermined reference horizontal ordinate, a predetermined reference vertical ordinate, a predetermined display width and a predetermined display height corresponding to the current time point; and $\Delta p = \Delta h$.

Step S113, caching the to-be-displayed video image of the target time point in advance according to the display parameter estimate value.

In step S104, the predetermined display parameters corresponding to the at least two time points in the preset time period are obtained first according to the current time point for estimating. Because the above parameters are obtained according to the current time point, the representativeness of the parameters may be ensured. The display parameter estimate value corresponding to the target time point is generated according to the obtained predetermined display parameters, where the target time point is the time point after the current time point and going away from the current time point by the preset interval; that is, the display parameters of the future time points may be obtained at the current time, the display parameter estimate value is used for caching the to-be-displayed video image of the target time point on the video layer in advance, namely, the to-be-displayed video image of the future time point is cached in advance. Because each frame of video images to-be-displayed is cached in advance, the to-be-displayed video image of the video layer and the to-be-displayed picture of the user layer may be displayed synchronously according to the preset rule without the phenomena of edge cutting or black edge, so that the visual experience of the user is better.

The to-be-displayed video image of the video layer and the to-be-displayed picture of the user layer are presented synchronously according to the preset rule.

The to-be-displayed video image of the video layer is the video image cached in advance by the underlying module of the video layer according to the display parameter estimate value.

The above preset rule at least includes the rule configured to match the video image and the picture of the user layer, so that the two layers of pictures displayed synchronously are the matched pictures. In addition, synchronous display of the disclosure refers to that the two layers of matched pictures are displayed at the same moment, or the time of displaying the two layers of matched pictures in sequence is short enough. Based on this, the above preset rule may further include a preset threshold value of the time interval for displaying the two layers of pictures in order.

In addition, a relationship between the display time of the video image and the picture of the user layer and the time point when the application issues the predetermined display parameters may further be specified in the preset rule, for example, time duration of the two actions, i.e., parameter issuing and displaying executed in sequence, and the like. When the two actions of parameter issuing and displaying are executed successively in the time duration short enough, a real-time and smooth picture scaling effect will be presented to the user.

According to the scaling method of the video image in the user interface presented by the display apparatus, the to-be-displayed video image is cached in advance through the video image scaling service based on the parameter estimation mechanism, so as to avoid delayed display of the video image due to caching time consumption and other reasons, thereby ensuring that the to-be-displayed picture of the video layer and the to-be-displayed picture of the user layer may be displayed synchronously, avoiding the phenomena of edge cutting and black edge, and bring better visual experience for user.

In addition, the embodiments of the disclosure further provide a scaling method of a video image in a user interface of a display apparatus, including the following.

Step S131, receiving an instruction for indicating enlarging the video image from a user, enlarging a transparent control of a user layer according to a first scaling rule.

Step S132, determining location information of the transparent control in a preset time period to generate a second scaling rule.

Step S133, enlarging a video image in a video layer to a target display location according to the second scaling rule; where the user interface includes a first view display region and a second view display region, the first view display region is configured to present the video image of the video layer, the second view display region is configured to present recommend information of the user layer, the user layer floats on the video layer, and a control of the user layer at the video image is transparent, so that the video image of the video layer penetrates through the user layer to be presented.

The specific implementations of any step in above steps 131-133 may refer to the embodiments of the above display apparatus, which is not repeated here.

In specific implementations, the disclosure further provides a nonvolatile storage medium, where the storage medium stores programs, and when executed, the programs may perform some or all of the steps in all the embodiments of the scaling method in the disclosure. The storage medium may be a disk, a light disk, a read-only memory (ROM for short), or a random access memory (RAM for short).

What is claimed is:

1. A display apparatus, comprising:
a display, configured to present a user interface, wherein the user interface is configured to present a video image of a video layer and recommend information of a user layer; the user layer comprises an image display region; and the video image, in a region overlapped with the image display region of the user layer, in the video layer is visible; and
a controller in communication with the display, wherein the controller is configured to:
present the user interface;
receive an instruction for indicating enlarging the video image from a user, and enlarge the image display region of the user layer according to a first scaling rule;
determine location information of the image display region in a preset time period to generate a second scaling rule, wherein the preset time period is a preset past period before a current time point; and
enlarge the video image in the video layer to a target display location according to the second scaling rule.

2. The display apparatus according to claim 1, wherein the controller is configured to determine the location information of the image display region in the preset time period to generate the second scaling rule by:
obtaining the user interface in the preset time period, determining the location information of the image display region in the preset time period, and calculating a scaling speed of the image display region; and
generating the second scaling rule according to the scaling speed.

3. The display apparatus according to claim 1, wherein the controller is configured to determine the location information of the image display region in the preset time period to generate the second scaling rule by:
obtaining predetermined display parameters of the image display region corresponding to at least two time points in the preset time period according to the current time point;
generating a display parameter estimate value corresponding to a target time point according to the obtained predetermined display parameters, wherein the target time point is a time point after the current time point and going away from the current time point by a preset interval; and
caching a video image to-be-displayed at the target time point in advance according to the display parameter estimate value.

4. The display apparatus according to claim 3, wherein the controller is further configured to obtain the predetermined display parameters corresponding to the at least two time points in the preset time period according to the current time point by:
obtaining predetermined display parameters corresponding to the current time point and at least one time point in the preset time period before the current time point.

5. The display apparatus according to claim 3, wherein the controller is configured to generate the display parameter estimate value corresponding to the target time point according to the obtained predetermined display parameters by:
calculating a predetermined parameter variation according to the obtained predetermined display parameters;
calculating a display parameter estimate variation corresponding to the target time point by using an estimate weight and the predetermined parameter variation; wherein the estimate weight is configured to adjust the predetermined parameter variation to obtain the display parameter estimate variation corresponding to the target time point; and
calculating the display parameter estimate value corresponding to the target time point according to the display parameter estimate variation.

6. The display apparatus according to claim 5, wherein the controller is further configured to:
after calculating the predetermined parameter variation, determine whether a number of use times of the estimate weight exceeds a preset quantity of use times;
in response to the number of use times of the estimate weight exceeding the preset quantity of use times, update the estimate weight of the target time point by multiplying a preset update coefficient with the estimate weight, wherein the preset update coefficient is configured to update the estimate weight according to the preset quantity of use times; and in response to the number of use times of the estimate weight not exceeding the preset quantity of use times, use a current estimate weight for next calculation.

7. The display apparatus according to claim 5, wherein the predetermined display parameters comprise a predetermined display height, a predetermined display width, and a predetermined reference point coordinate;
wherein the controller is configured to calculate the predetermined parameter variation according to the obtained predetermined display parameters by:
calculating a variation of the predetermined display height or a variation of the predetermined display width corresponding to the current time point and at least one time point in the preset time period before the current time point to serve as the predetermined parameter variation.

8. The display apparatus according to claim 5, wherein the controller is configured to calculate the display parameter estimate variation corresponding to the target time point by:
calculating a product of the estimate weight and the predetermined parameter variation to serve as the display parameter estimate variation corresponding to the target time point.

9. The display apparatus according to claim 5, wherein the controller is configured to calculate the display parameter estimate value corresponding to the target time point according to the display parameter estimate variation by using following formulas:

$$x_G = x_i - \frac{\Delta p}{2};$$

$$y_G = y_i - \frac{\Delta p}{2};$$

$$w_G = w_i + \left(\Delta p \times \frac{w_i}{h_i}\right)l$$

$$h_G = h_i + \Delta p;$$

wherein $x_G$, $y_G$, $w_G$ and $h_G$ respectively represent a estimation reference horizontal ordinate, a estimation reference vertical ordinate, a display width estimate value and a display height estimate value corresponding to the target time point; $x_i$, $y_i$, $w_i$ and $h_i$ respectively represent a predetermined reference horizontal ordinate, a predetermined reference vertical ordinate, a predetermined display width and a predetermined display height corresponding to the current time point; and $\Delta p$ represents the display parameter estimate variation.

10. A scaling method of a video image in a user interface of a display apparatus, comprising:
receiving an instruction for indicating enlarging the video image on the user interface of the display apparatus from a user, and enlarging an image display region of a user layer according to a first scaling rule, wherein the user interface is configured to present the video image of a video layer and recommend information of the user layer; the user layer comprises an image display region; and the video image, in a region overlapped with the image display region of the user layer, in the video layer is visible;
determining location information of the image display region in a preset time period to generate a second scaling rule, wherein the preset time period is a preset past period before a current time point; and
enlarging the video image in a video layer to a target display location according to the second scaling rule.

11. The method according to claim 10, wherein the determining the location information of the image display region in the preset time period to generate the second scaling rule, comprises:
obtaining the user interface in the preset time period, determining the location information of the image display region in the preset time period, and calculating a scaling speed of the image display region; and
generating the second scaling rule according to the scaling speed.

12. The method according to claim 10, wherein the determining the location information of the image display region in the preset time period to generate the second scaling rule, comprises:
obtaining predetermined display parameters of the image display region corresponding to at least two time points in the preset time period according to a current time point;
generating a display parameter estimate value corresponding to a target time point according to the obtained predetermined display parameters, wherein the target time point is a time point after the current time point and going away from the current time point by a preset interval; and
caching a video image to-be-displayed at the target time point in advance according to the display parameter estimate value.

13. The method according to claim 12, wherein the obtaining the predetermined display parameters corresponding to the at least two time points in the preset time period according to the current time point by:
obtaining predetermined display parameters corresponding to the current time point and at least one time point in the preset time period before the current time point.

14. The method according to claim 12, wherein the generating the display parameter estimate value corresponding to the target time point according to the obtained predetermined display parameters, comprises:
calculating a predetermined parameter variation according to the obtained predetermined display parameters;
calculating a display parameter estimate variation corresponding to the target time point by using an estimate weight and the predetermined parameter variation; wherein the estimate weight is configured to adjust the predetermined parameter variation to obtain the display parameter estimate variation corresponding to the target time point; and
calculating the display parameter estimate value corresponding to the target time point according to the display parameter estimate variation.

15. The method according to claim 14, wherein after calculating the predetermined parameter variation, the method further comprises:
determining whether a number of use times of the estimate weight exceeds a preset quantity of use times;
in response to the number of use times of the estimate weight exceeding the preset quantity of use times, updating the estimate weight of the target time point by multiplying a preset update coefficient with the estimate weight, wherein the preset update coefficient is configured to update the estimate weight according to the preset quantity of use times; and
in response to the number of use times of the estimate weight not exceeding the preset quantity of use times, using a current estimate weight for next calculation.

16. The method according to claim 14, wherein the predetermined display parameters comprise a predetermined display height, a predetermined display width, and a predetermined reference point coordinate;
  wherein the calculating the predetermined parameter variation according to the obtained predetermined display parameters, comprises:
  calculating a variation of the predetermined display height or a variation of the predetermined display width corresponding to the current time point and at least one time point in the preset time period before the current time point to serve as the predetermined parameter variation.

17. The method according to claim 14, wherein the calculating the display parameter estimate variation corresponding to the target time point comprises:
  calculating a product of the estimate weight and the predetermined parameter variation to serve as the display parameter estimate variation corresponding to the target time point.

18. The method according to claim 14, wherein the calculating the display parameter estimate value corresponding to the target time point according to the display parameter estimate variation by using following formulas:

$$x_G = x_i - \frac{\Delta p}{2};$$

$$y_G = y_i - \frac{\Delta p}{2};$$

$$w_G = w_i + \left(\Delta p \times \frac{w_i}{h_i}\right);$$

$$h_G = h_i + \Delta p;$$

wherein $x_G$, $y_G$, $w_G$ and $h_G$ respectively represent a estimation reference horizontal ordinate, a estimation reference vertical ordinate, a display width estimate value and a display height estimate value corresponding to the target time point; $x_i$, $y_i$, $w_i$ and $h_i$ respectively represent a predetermined reference horizontal ordinate, a predetermined reference vertical ordinate, a predetermined display width and a predetermined display height corresponding to the current time point; and $\Delta p$ represents the display parameter estimate variation.

* * * * *